US011166066B2

(12) United States Patent
Yeo

(10) Patent No.: US 11,166,066 B2
(45) Date of Patent: *Nov. 2, 2021

(54) DISPLAY APPARATUS, CONTENT RECOGNIZING METHOD THEREOF, AND NON-TRANSITORY COMPUTER READABLE RECORDING MEDIUM

(71) Applicant: Samsung Electronics Co., Ltd., Suwon-si (KR)

(72) Inventor: Hae-dong Yeo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/803,428

(22) Filed: Feb. 27, 2020

(65) Prior Publication Data

US 2020/0204857 A1 Jun. 25, 2020

Related U.S. Application Data

(63) Continuation of application No. 15/848,899, filed on Dec. 20, 2017, now Pat. No. 10,616,639.

(51) Int. Cl.
*G06F 3/0482* (2013.01)
*G06F 3/14* (2006.01)
(Continued)

(52) U.S. Cl.
CPC ....... *H04N 21/4325* (2013.01); *G06F 3/0482* (2013.01); *G06N 20/00* (2019.01);
(Continued)

(58) Field of Classification Search
CPC ......... H04N 21/4325; H04N 21/44008; H04N 21/41407; H04N 21/4532; G06F 3/0482
See application file for complete search history.

(56) References Cited

U.S. PATENT DOCUMENTS 8,776,105 B2 7/2014 Sinha et al.
8,966,533 B2 2/2015 Yamagishi et al.
(Continued)

FOREIGN PATENT DOCUMENTS

CN 103313132 A 9/2013
CN 105009596 A 10/2015
(Continued)

OTHER PUBLICATIONS

Chinese Office Action dated Nov. 30, 2020, issued in Chinese Patent Application No. 201780076820.0.
(Continued)

*Primary Examiner* — Thai Q Tran
*Assistant Examiner* — Jose M Mesa
(74) *Attorney, Agent, or Firm* — Jefferson IP Law, LLP

(57) ABSTRACT

A display apparatus, a content recognizing method thereof, and a non-transitory computer readable recording medium are provided. The display apparatus includes a display, a memory configured to store information regarding a fingerprint which is generated by extracting a characteristic of a content, and a content corresponding to the fingerprint, a communication device configured to communicate with a server, and at least one processor configured to extract a characteristic of a screen of a content currently reproduced on the display and generate a fingerprint, to search presence/absence of a fingerprint matching the generated fingerprint in the memory, and, based on a result of the searching, to determine whether to transmit a query comprising the generated fingerprint to the server to request information on the currently reproduced content.

16 Claims, 27 Drawing Sheets

(51) Int. Cl.
*G06N 20/00* (2019.01)
*H04N 21/432* (2011.01)
*H04N 21/44* (2011.01)
H04N 21/45 (2011.01)
H04N 21/414 (2011.01)

(52) U.S. Cl.
CPC ......... *H04N 21/44008* (2013.01); *G06F 3/14* (2013.01); *H04N 21/41407* (2013.01); *H04N 21/4532* (2013.01)

(56) References Cited

U.S. PATENT DOCUMENTS

| | | | |
|---|---|---|---|
| 9,113,202 | B1 | 8/2015 | Wiseman et al. |
| 9,195,663 | B2 | 11/2015 | Ramanathan et al. |
| 9,313,359 | B1 | 4/2016 | Stojancic et al. |
| 9,323,840 | B2 * | 4/2016 | Harron ................ G06F 16/7328 |
| 9,619,123 | B1 * | 4/2017 | Hughes .............. H04N 21/6581 |
| 9,729,912 | B2 | 8/2017 | Kemp |
| 10,028,011 | B2 * | 7/2018 | Yao .................... H04N 21/4331 |
| 10,219,011 | B2 | 2/2019 | Jung et al. |
| 2008/0089551 | A1 | 4/2008 | Heather et al. |
| 2011/0289114 | A1 | 11/2011 | Yu et al. |
| 2011/0289532 | A1 | 11/2011 | Yu et al. |
| 2011/0296452 | A1 * | 12/2011 | Yu ....................... G06Q 30/0251 725/9 |
| 2012/0029670 | A1 | 2/2012 | Mont-Reynaud et al. |
| 2012/0095958 | A1 | 4/2012 | Pereira et al. |
| 2014/0195548 | A1 | 7/2014 | Harron |
| 2015/0089535 | A1 | 3/2015 | Moon et al. |
| 2015/0222949 | A1 * | 8/2015 | An ....................... H04N 21/478 725/116 |
| 2016/0073148 | A1 | 3/2016 | Winograd et al. |
| 2016/0088338 | A1 | 3/2016 | Kemp |
| 2016/0127759 | A1 | 5/2016 | Jung et al. |
| 2016/0234550 | A1 | 8/2016 | Jung et al. |

FOREIGN PATENT DOCUMENTS

| | | |
|---|---|---|
| CN | 105451053 A | 3/2016 |
| CN | 105578267 A | 5/2016 |
| CN | 105684457 A | 6/2016 |
| CN | 106062801 A | 10/2016 |
| EP | 2 916 554 A1 | 9/2015 |
| EP | 2 919 478 A1 | 9/2015 |
| EP | 3 054 698 A1 | 8/2016 |
| KR | 10-1128695 B1 | 3/2012 |
| KR | 10-2016-0097667 A | 8/2016 |
| WO | 2013-095893 A1 | 6/2013 |
| WO | 2014/129803 A1 | 8/2014 |
| WO | 2015/065779 A1 | 5/2015 |
| WO | 2015/100372 A1 | 7/2015 |

OTHER PUBLICATIONS

ATSC Standard: Interactive Services Standard, A/105:2015, Oct. 29, 2015, XP 017848734, Washington, D.C. USA.
Extended European Search Report dated Sep. 18, 2020, issued in European Patent Application No. 20177505.3.

* cited by examiner

FIG. 7A
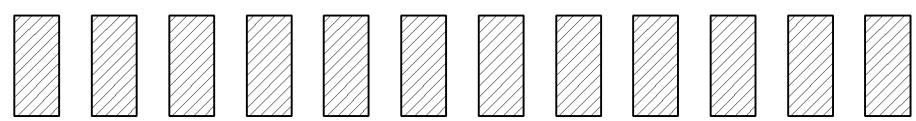
FIG. 7B
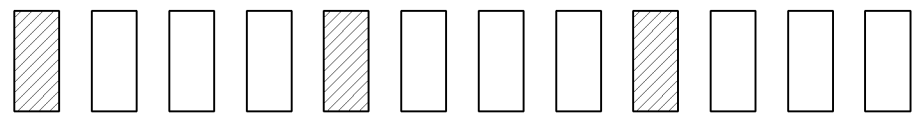
 FRAME WITH FP      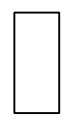 FRAME WITHOUT FP

FIG. 8

| TIME | CHANNEL | GENRE | EXECUTED ADDITIONAL APPLICATION | ⋮ |
|---|---|---|---|---|
| 16:00 | ⋮ | ⋮ | ⋮ | ⋮ |
| 17:00 | CH 3 | NEWS | WEB BROWSER | ⋮ |
| 18:00 | CH 2 | DRAMA | SHOPPING APP | ⋮ |
| 19:00 | ⋮ | ⋮ | ⋮ | ⋮ |

DISPLAY APPARATUS, CONTENT RECOGNIZING METHOD THEREOF, AND NON-TRANSITORY COMPUTER READABLE RECORDING MEDIUM

CROSS-REFERENCE TO RELATED APPLICATION(S)

This application is a continuation application of prior application Ser. No. 15/848,899, filed on Dec. 20, 2017, which was based on and claimed priority under 35 U.S.C. § 119(a) of a Korean patent application number 10-2016-0175741, filed on Dec. 21, 2016, in the Korean Intellectual Property Office, and of a Korean patent application number 10-2017-0133174, filed on Oct. 13, 2017, in the Korean Intellectual Property Office, the disclosure of each of which is incorporated by reference herein in its entirety.

TECHNICAL FIELD

The present disclosure relates to a display apparatus, a content recognizing method thereof, and at least one non-transitory computer readable recording medium. More particularly, the present disclosure relates to a display apparatus which can efficiently recognize a content viewed by a user, a content recognizing method thereof, and a non-transitory computer readable recording medium.

In addition, apparatuses and methods consistent with various embodiments relate to an artificial intelligence (AI) system which simulates functions of the human brain, such as recognizing, determining, or the like by utilizing a machine learning algorithm, such as deep learning, and application technology thereof.

BACKGROUND

In recent years, display apparatus, such as televisions (TVs) are increasingly using set-top boxes rather than directly receiving broadcast signals. In this case, a display apparatus cannot know what content is currently viewed by a user.

If the display apparatus knows what content is currently viewed by the user, smart services, such as targeting advertisements, content recommendation, related-information services can be provided. To achieve this, automatic content recognition (ACR) which is technology for recognizing a currently displayed content at a display apparatus is developed.

In a related-art method, a display apparatus periodically captures a screen which is being currently viewed, extracts a characteristic for recognizing the screen, and periodically requests a server to recognize the current screen through a query.

However, the display apparatus has no choice but to frequently send a query to the server in order to rapidly detect a change in the content which is being viewed, and accordingly, ACR requires many resources and much cost.

With the development of computer technology, data traffic increases in the form of an exponential function, and artificial intelligence (AI) becomes an important trend that leads future innovation. Since AI simulates the way the human thinks, it can be applied to all industries infinitely.

The AI system refers to a computer system that implements high intelligence as human intelligence, and is a system that makes a machine learn and determine by itself and become smarter unlike an existing rule-based smart system. The AI system can enhance a recognition rate as it is used and can exactly understand user's taste, and thus the existing rule-based smart system is increasingly being replaced with a deep-learning based-AI system.

The AI technology includes machine learning (for example, deep learning) and element technology using machine learning.

Machine learning is algorithm technology for classifying//learning characteristics of input data by itself, and element technology is technology for simulating functions of the human brain, such as recognizing, determining, or the like by utilizing a machine learning algorithm, such as deep learning, and may include technical fields, such as linguistic understanding, visual understanding, inference/prediction, knowledge representation, operation control, or the like.

Various fields to which the AI technology is applied are as follows. The linguistic understanding is technology for recognizing human languages/characters and applying/processing the same, and may include natural language processing, machine translation, a dialog system, question and answer, voice recognition/synthesis. The visual understanding is technology for recognizing things in the same way as humans do with eyes, and may include object recognition, object tracking, image search, people recognition, scene understanding, space understanding, and image enhancement. The inference/prediction is technology for inferring and predicting logically by determining information, and may include knowledge/probability-based inference, optimization prediction, preference-based planning, recommendation, or the like. The knowledge representation is technology for automating human experience information into knowledge data, and may include knowledge establishment (data generation/classification), knowledge management (data utilization), or the like. The operation control is technology for controlling autonomous driving of vehicles and a motion of a robot, and may include motion control (navigation, collision, driving), manipulation control (behavior control), or the like.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above mentioned problems and/or disadvantages and to provide at least the advantages described below. Accordingly, an aspect of the present disclosure is to provide a display apparatus which can adjust a content recognition period using information of a content, a content recognizing method thereof, and a non-transitory computer readable recording medium.

In accordance with an aspect of the present disclosure, a display apparatus is provided. The display apparatus includes a display, a memory configured to store information regarding a fingerprint which is generated by extracting a characteristic of a content, and a content corresponding to the fingerprint, a communication device configured to communicate with a server, and at least one processor configured to extract a characteristic of a screen of a content currently reproduced on the display and generate a fingerprint, to search presence/absence of a fingerprint matching the generated fingerprint in the memory, and, based on a result of the searching, to determine whether to transmit a query including the generated fingerprint to the server to request information on the currently reproduced content.

The at least one processor may be configured to, in response to the fingerprint matching the generated fingerprint being searched in the memory, recognize the currently reproduced content based on information on a content corresponding to the searched fingerprint, and the at least one processor may be configured to, in response to the fingerprint matching the generated fingerprint not being searched in the memory, control the communication device to transmit the query including the fingerprint to the server to request the information on the currently reproduced content.

The at least one processor may be configured to, in response to the fingerprint matching the generated fingerprint not being searched in the memory, control the communication device to receive the information on the currently reproduced content and fingerprints of the currently reproduced content from the server in response to the query.

The at least one processor may be configured to determine a type of the content based on the information on the currently reproduced content, and to change a content recognition period according to the determined type of the content.

In addition, the at least one processor may be configured to recognize a content in every first period in response to the content being an advertisement content, and to recognize a content in every second period which is longer than the first period in response to the content being a broadcast program content.

The at least one processor may be configured to determine a type of the content based on the information on the currently reproduced content, and to change a quantity of fingerprints of the currently reproduced content to be received according to the determined type of the content.

The at least one processor may be configured to calculate a probability that the reproduced content is changed based on the information on the currently reproduced content and a viewing history, and to change a content recognition period according to the calculated probability.

The at least one processor may be configured to predict a content to be reproduced next time based on a viewing history, and to request information on the predicted content from the server.

The at least one processor may be configured to receive additional information related to the currently reproduced content from the server, and to control the display to display the received additional information with the currently reproduced content.

In accordance with another aspect of the present disclosure, a method for recognizing a content of a display apparatus is provided. The method includes extracting a characteristic of a screen of a currently reproduced content and generating a fingerprint, searching whether a fingerprint matching the generated fingerprint is stored in the display apparatus, and, based on a result of the searching, determining whether to transmit a query including the generated fingerprint to an external server to request information on the currently reproduced content.

The determining whether to transmit the query to the external server may include in response to the fingerprint matching the generated fingerprint being searched in the display apparatus, recognizing the currently reproduced content based on information on a content corresponding to the searched fingerprint, and, in response to the fingerprint matching the generated fingerprint not being searched in the display apparatus, transmitting the query including the fingerprint to the server to request the information on the currently reproduced content.

In addition, the method may further include, in response to the fingerprint matching the generated fingerprint not being searched in the display apparatus, receiving the information on the currently reproduced content and fingerprints of the currently reproduced content from the server in response to the query.

The method may further include determining a type of the content based on the information on the currently reproduced content, and changing a content recognition period according to the determined type of the content.

The changing the content recognition period may include recognizing a content in every first period in response to the content being an advertisement content, and recognizing a content in every second period which is longer than the first period in response to the content being a broadcast program content.

The method may further include determining a type of the content based on the information on the currently reproduced content, and changing a quantity of fingerprints of the currently reproduced content to be received according to the determined type of the content.

The method may further include calculating a probability that the reproduced content is changed based on the information on the currently reproduced content and a viewing history, and changing a content recognition period according to the calculated probability.

The method may further include predicting a content to be reproduced next time based on a viewing history, and requesting information on the predicted content from the server.

The method may further include receiving additional information related to the currently reproduced content from the server, and displaying the received additional information with the currently reproduced content.

In accordance with another aspect of the present disclosure, at least one non-transitory computer readable recording medium is provided. The at least one non-transitory computer readable recording medium includes a program for executing a method for recognizing a content of a display apparatus, the method including extracting a characteristic of a screen of a currently reproduced content and generating a fingerprint, searching whether a fingerprint matching the generated fingerprint is stored in the display apparatus, and determining, based on a result of the searching, whether to transmit a query including the generated fingerprint to an external server to request information on the currently reproduced content.

According to various embodiments described above, the display apparatus dynamically adjusts a ratio and a period of performance between server automatic content recognition (ACR) and local ACR, thereby reducing a load to the server and increasing accuracy in recognizing a content.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 7A and 7B are views illustrating fingerprint information having different granularities according to an embodiment of the present disclosure;

FIG. 8 is a view illustrating viewing history information according to an embodiment of the present disclosure;

Throughout the drawings, like reference numerals will be understood to refer to like parts, components, and structures.

DETAILED DESCRIPTION

Figure 1:
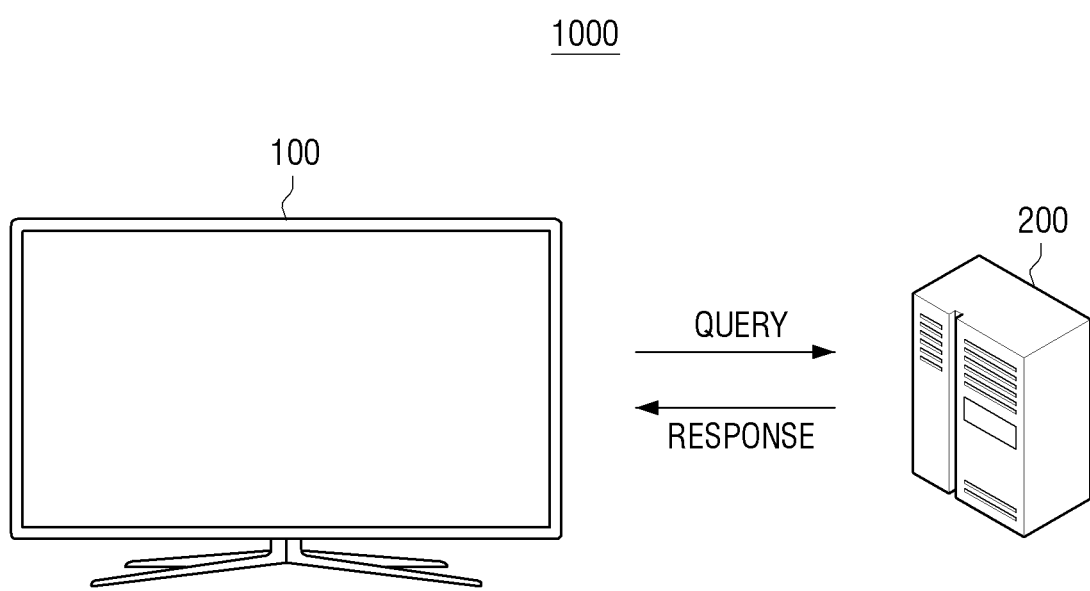
FIG. 1 illustrates a display system according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The terms, such as "first" and "second" used in various embodiments may be used to explain various elements, but do not limit the corresponding elements. These terms may be used for the purpose of distinguishing one element from another element. For example, a first element may be named a second element without departing from the scope of right of the present disclosure, and similarly, a second element may be named a first element. The term "and/or" includes a combination of a plurality of related items or any one of the plurality of related items.

The terms used in various embodiments of the present disclosure are just for the purpose of describing particular embodiments and are not intended to restrict and/or limit the present disclosure. As used herein, the singular forms are intended to include the plural forms as well, unless the context clearly indicates otherwise. The term "include" or "have" indicates the presence of features, numbers, operations, elements, and components described in the specification, or a combination thereof, and do not preclude the presence or addition of one or more other features, numbers, operation, elements, or components, or a combination thereof.

In addition, a "module" or "unit" used in embodiments performs one or more functions or operations, and may be implemented by using hardware or software or a combination of hardware and software. In addition, a plurality of "modules" or a plurality of "units" may be integrated into one or more modules, except for a "module" or "unit" which needs to be implemented by specific hardware, and may be implemented as one or more processors.

Hereinafter, the present disclosure will be described below with reference to the accompanying drawings.

FIG. 1 illustrates a display system according to an embodiment of the present disclosure.

Referring to FIG. 1, a display system 1000 includes a display apparatus 100 and a server 200.

The display apparatus 100 may be a smart television (TV), but this is merely an example, and the display apparatus 100 may be implemented by using various types of apparatuses, such as a projection TV, a monitor, a kiosk, a notebook personal computer (PC), a tablet, a smartphone, a personal digital assistant (PDA), an electronic picture frame, a table display, or the like.

The display apparatus 100 may extract a characteristic from a screen of a currently reproduced content, and may generate a fingerprint. In addition, the display apparatus 100 may perform local automatic content recognition (ACR) by searching the generated fingerprint in a fingerprint database stored in the display apparatus 100, and recognizing the currently reproduced content, and may perform server ACR by transmitting a query including the generated fingerprint to the server 200 and recognizing the content. More particularly, the display apparatus 100 may appropriately adjust a ratio of performance between the local ACR and the server ACR by adjusting a content recognition period, a quantity of fingerprints to be received from the server 200, or the like using recognized content information, a viewing history, or the like.

The server 200 may be implemented by using an apparatus that can transmit information including recognition (or identification (ID)) information for distinguishing a specific image from other images to the display apparatus 100. For example, the server 200 may transmit a fingerprint to the display apparatus 100. The fingerprint is a kind of identification information that can distinguish an image from other images.

Specifically, the fingerprint is characteristic data that is extracted from video and audio signals included in a frame. Unlike metadata based on a text, the fingerprint may reflect unique characteristics of a signal. For example, when an audio signal is included in the frame, the fingerprint may be data representing characteristics of the audio signal, such as a frequency, an amplitude, or the like. When a video (or still image) signal is included in the frame, the fingerprint may be data representing characteristics, such as a motion vector, color, or the like.

The fingerprint may be extracted by various algorithms. For example, the display apparatus 100 or the server 200 may divide an audio signal according to regular time intervals, and may calculate a size of a signal of frequencies included in each time interval. In addition, the display apparatus 100 or the server 200 may calculate a frequency slope by obtaining a difference in size between signals of adjacent frequency sections. A fingerprint on the audio signal may be generated by setting 1 when the calculated frequency slope is a positive value and setting 0 when the calculated frequency slope is a negative value.

The server 200 may store a fingerprint on a specific image. The server 200 may store one or more fingerprints on an already registered image, and, when two or more fingerprints are stored regarding a specific image, the fingerprints may be managed as a fingerprint list for the specific image.

The term "fingerprint" used in the present disclosure may refer to one fingerprint on a specific image, or according to circumstances, may refer to a fingerprint list which is formed of a plurality of fingerprints on a specific image.

The term "frame" used in the present disclosure refers to a series of data having information on an audio or an image. The frame may be data on an audio or an image during a predetermined time. In the case of a digital image content, the frame may be formed of 30-60 image data per second, and these 30-60 image data may be referred to as a frame. For example, when a current frame and a next frame of an image content are used together, the frame may refer to respective image screens included in the content and continuously displayed.

Although FIG. 1 depicts that the display system 1000 includes one display apparatus 100 and one server 200, a plurality of display apparatuses 100 may be connected with one server 200 or a plurality of servers 200 may be connected with one display apparatus 100. Other combinations are also possible.

Figure 2A:
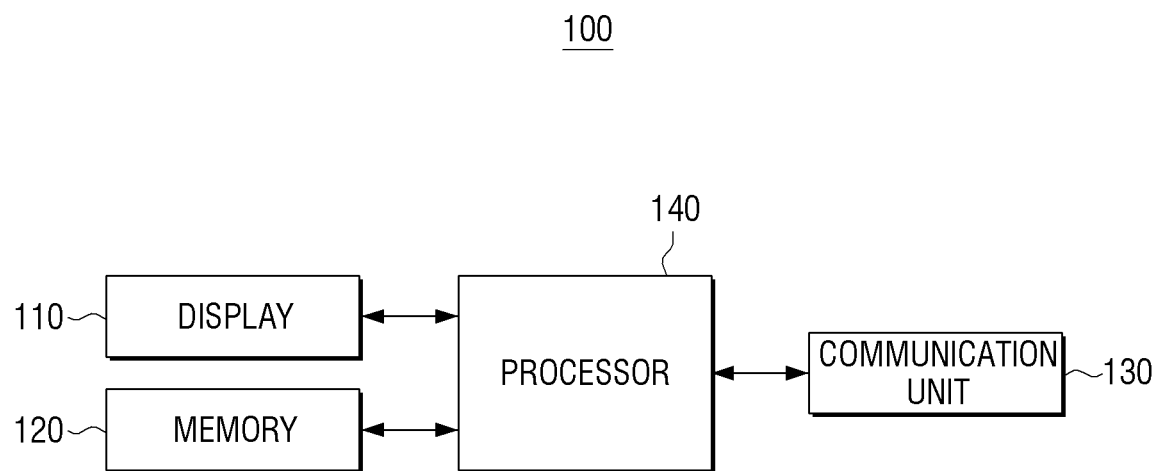
FIGS. 2A and 2B are schematic block diagrams illustrating a configuration of a display apparatus according to an embodiment of the present disclosure.

FIG. 2A is a block diagram illustrating a configuration of a display apparatus according to an embodiment of the present disclosure.

Referring to FIG. 2A, the display apparatus 100 may include a display 110, a memory 120, a communication unit 130, and a processor 140.

The display 110 may display various image contents, information, a user interface (UI), or the like which are provided by the display apparatus 100. For example, the display apparatus 100 may display an image content, a broadcast program image, a user interface window which are provided by a set-top box (not shown).

The memory 120 may store various modules, software, and data for driving the display apparatus 100. For example, the memory 120 may store a plurality of fingerprints, information on contents corresponding to the fingerprints, viewing history information, or the like. The fingerprints stored in the memory 120 may be those which are generated by the display apparatus 100 itself, or may be those which are received from the server 200. The memory 120 may attach index information for local ACR to the fingerprints and store the fingerprints.

In addition, when a content stored in the memory 120 is reproduced by the display apparatus 100, a fingerprint may be paired with the corresponding content and may be stored in the memory 120. For example, the fingerprint may be added to each frame of the content and may be stored in the form of a new file combining the content and the fingerprint. In another example, the fingerprint may further include information mapped onto a corresponding frame of the content.

The communication unit 130 may communicate with external devices, such as the server 200 using a wire/wireless communication method. For example, the communication unit 130 may exchange, with the server 200, data, such as a fingerprint, content information, viewing history information, additional information related to a content, and a control signal, such as a recognition period change control signal.

The processor 140 may recognize what content is currently reproduced, and may control to perform ACR with appropriate precision based on the result of recognizing. For example, the processor 140 may adjust a content recognition period based on content information, and may determine a content to be received from the server 200 in advance and stored and a quantity of fingerprints on the content.

The processor 140 may extract a characteristic of a screen of the currently reproduced content, and may generate a fingerprint. In addition, the processor 140 may search whether there is a fingerprint matching the generated fingerprint from among the plurality of fingerprints stored in the memory 120. In addition, the processor 140 may transmit a query to the server 200 according to the result of searching, and may determine whether to try to perform server ACR. For example, the processor 140 may try to perform local ACR, first, in order to reduce a load on the server 200.

In response to a fingerprint matching the generated fingerprint being searched, the processor 140 may recognize the currently reproduced content based on information on the content corresponding to the searched fingerprint. For example, the information on the content corresponding to the fingerprint may include a position of a current frame in the total frames, a reproducing time, or the like, which are information on the current frame. In addition, the information on the content corresponding to the fingerprint may include at least one of a content name, a content ID, a content provider, content series information, a genre, information on whether the content is a real-time broadcast, and information on whether the content is a paid content.

On the other hand, in response to the fingerprint matching the generated fingerprint not being searched, the processor 140 may control the communication unit 130 to transmit a query for requesting information on the currently reproduced content to the server 200. For example, the query may include the generated fingerprint, a viewing history, information on the display apparatus 100, or the like.

In addition, the processor 140 may control the communication unit 130 to receive the information on the currently reproduced content and a fingerprint of the currently reproduced content from the server 200 in response to the query. Herein, the fingerprint of the currently reproduced content may be a fingerprint regarding frames which are positioned after a current frame in time in the whole content. Since the processor 140 knows time indicated by the position of the current frame in the whole content based on the fingerprint included in the query, the processor 140 may receive, from the server, a fingerprint on frames which are expected to be reproduced after the current frame.

As described above, the processor 140 may recognize the content by combining the local ACR and the server ACR appropriately. By doing so, the processor 140 may recognize the content currently reproduced on the display 110 while minimizing a load on the server 200.

To appropriately combine the local ACR and the server ACR, the processor 140 may determine a fingerprint to be received from the server 200 in advance for the local ACR based on at least one of the result of content recognition and the viewing history, and may determine whether to change the content recognition period. For example, the processor 140 may determine what content is considered to receive the fingerprint, and how many fingerprints will be received at a time.

According to an embodiment of the present disclosure, the processor 140 may determine a type of the content based on the information on the currently reproduced content. In addition, the processor 140 may change the content recognition period according to the type of the content. The type of the content may be classified according to a criterion, such as details of the content, a genre, information on whether the content is a real-time broadcast, an importance, or the like.

For example, in response to the currently reproduced content being recognized as an advertisement content, the processor 140 may adjust the content recognition period to be short (for example, adjust to recognize the screen of the currently displayed content in every frame). In response to the currently reproduced content being recognized as a movie content or a broadcast program content, the processor 140 may adjust the content recognition period to be long (for example, adjust to recognize the screen of the currently displayed content once every 30 seconds).

The recognition period for each type may be a predetermined period. The respective periods may be personalized and set according to the above-described various criteria and the viewing history.

In the case of an advertisement content, the processor 140 needs to frequently recognize the content since an advertisement is normally changed to another advertisement within a short time. To the contrary, in the case of a movie content, the processor 140 does not need to frequently recognize the content since it is just determined whether the movie is being continuously viewed.

In the above example, the type of the content is classified according to the genre of the content. As in the above example, in the case of the advertisement content, the content may be recognized in every frame, but may be infrequently recognized according to other criteria, such as an importance or a viewing history.

The number of frames to be received from the server 200 in advance and stored may vary according to the recognized type of the content. Since there are fingerprints corresponding to the respective frames, the quantity of fingerprints to be received in advance and stored may also vary. For example, in the case of video on demand (VOD) or digital video recorder (DVR), the server 200 may have all pieces of image information, but in the case of a live broadcast, the server 200 may receive image information of a few seconds before the display apparatus 100 does. Let's take an example of a 60 Hz image displaying 60 frames per second. In the case of one hour of VOD, the server 200 may own fingerprints corresponding to about 200,000 frames, but in the case of a live broadcast, the server 200 may only own fingerprints corresponding to about hundreds of frames.

Accordingly, the processor 140 may determine a quantity of fingerprints to be requested according to the recognized content. In addition, the processor 140 may change the content recognition period based on a quantity of fingerprints received at a time.

According to an embodiment of the present disclosure, the processor 140 may change the content recognition period based on the information on the recognized content and the viewing history. The viewing history may include a content that the user has viewed, a viewing time, an additional application which has been executed at the time of viewing.

For example, the processor 140 may determine whether the currently reproduced content will continuously be reproduced or another content will be reproduced by comparing the currently reproduced content and the viewing history. In addition, the processor 140 may request information on a fingerprint corresponding to the content which is expected to be reproduced next time from the server 200.

According to an embodiment of the present disclosure, the processor 140 may receive additional information related to the content, in addition to the fingerprint of the currently reproduced content and the fingerprint corresponding to the content which is expected to be reproduced next time. For example, the additional information may include a content name, a content reproducing time, a content provider, PPL product information appearing in the content, an advertisement related to the PPL product information, and an additional executable application, or the like.

In addition, the processor 140 may control the display 110 to display the received additional information with the currently reproduced content.

In the above-described examples, the display apparatus 100 requests the information of the content, such as the fingerprint from the server 200. However, the server 200 may transmit the information necessary for the display apparatus 100, such as the fingerprint, to the display apparatus 100 without receiving a request.

According to various embodiments of the present disclosure, the display apparatus 100 may estimate the type of the content using a data recognition model. The data recognition model may be, for example, a set of algorithms for estimating a type of a content using information of the content and/or a fingerprint generated from the content, using a result of statistical machine learning.

In addition, the display apparatus 100 may calculate a probability that the content is changed using the data recognition model. The data recognition model may be, for example, a set of algorithms for estimating a probability that the reproduced content is changed using the information of the content (for example, a content reproducing time, a content reproducing channel, a type of a content, or the like).

The data recognition model may be implemented by using software or an engine for executing the set of algorithms. The data recognition model implemented by using the software or engine may be executed by the processor in the display apparatus 100 or a processor of a server (for example, the server 200 in FIG. 1).

According to an embodiment of the present disclosure, the server 200 may include configurations of a normal server device. For example, the server 200 may include a memory 210, a communication unit 220, a broadcast signal receiver 230, and a processor 240.

The server 200 may capture video/audio information of a plurality of contents. For example, the server 200 may collect an image on a frame basis. For example, the server 200 may divide various contents into data of a frame unit in advance, and may collect the data. In addition, the server 200 may generate a fingerprint by analyzing the collected frames. In another example, the server 200 may receive a broadcast signal from a broadcasting station and may capture video/audio information from the received signal. The server 200 may receive the broadcast signal before the display apparatus 100 does.

For example, the fingerprint generated by the server 200 may be information for distinguishing between a screen and an audio at a specific time. Alternatively, the fingerprint generated by the server 200 may include information on a scene change pattern, and may be information indicating what content is being continuously viewed. The server 200 may establish a database in which the generated fingerprint and the information on the content corresponding to the fingerprint are indexed to be easily searched. For example, the information on the content corresponding to the fingerprint may include a position of a current frame in the whole content, a reproducing time, or the like. In addition, the information on the content corresponding to the fingerprint may include at least one of a content name, a content ID, a content provider, content series information, a genre, information on whether the content is a real-time broadcast, information on whether the content is a paid content.

In response to a query being received from the display apparatus 100, the server 200 may extract at least one fingerprint from the query. In addition, the server 200 may receive information on the display apparatus 100 which has transmitted the query.

The server 200 may match the extracted fingerprint with information stored in the database, and may determine what content is being currently viewed by the display apparatus 100. The server 200 may transmit a response on the determined content information to the display apparatus 100.

In addition, the server 200 may manage the viewing history of each of the display apparatuses 100 using the received information on the display apparatus 100 and the determined content information. By doing so, the server 200 may provide a service which is personalized for each of the display apparatuses 100.

The server 200 may predict a content to be displayed on the display apparatus 100 next time, using the information of the content currently displayed on the display apparatus 100 and the viewing history information. In addition, the server 200 may transmit a fingerprint which is extracted from the predicted content to the display apparatus 100. For example, the extracted fingerprint may be a fingerprint corresponding to a frame which is positioned after the current frame in time in the whole content displayed on the display apparatus 100. In another example, the extracted fingerprint may be a fingerprint on a content of another broadcast channel which is predicted based on the viewing history information.

In addition, the server 200 may determine a content recognition period by analyzing a content image or using electronic program guide (EPG) information. According to the determined content recognition period, the server 200 may determine the number of fingerprints necessary for performing local ACR at the display apparatus 100. The display apparatus 100 may generate a fingerprint by analyzing a currently displayed frame in every content recognition period. In addition, the display apparatus 100 may search the generated fingerprint in the fingerprint data base which is received from the server 200 and stored. Accordingly, the server 200 may transmit only the fingerprint corresponding to the frame for the display apparatus 100 to recognize the content. Since only the necessary number of fingerprints are transmitted, the server 200 may minimize a communication load even when performing server ACR.

Figure 2B:
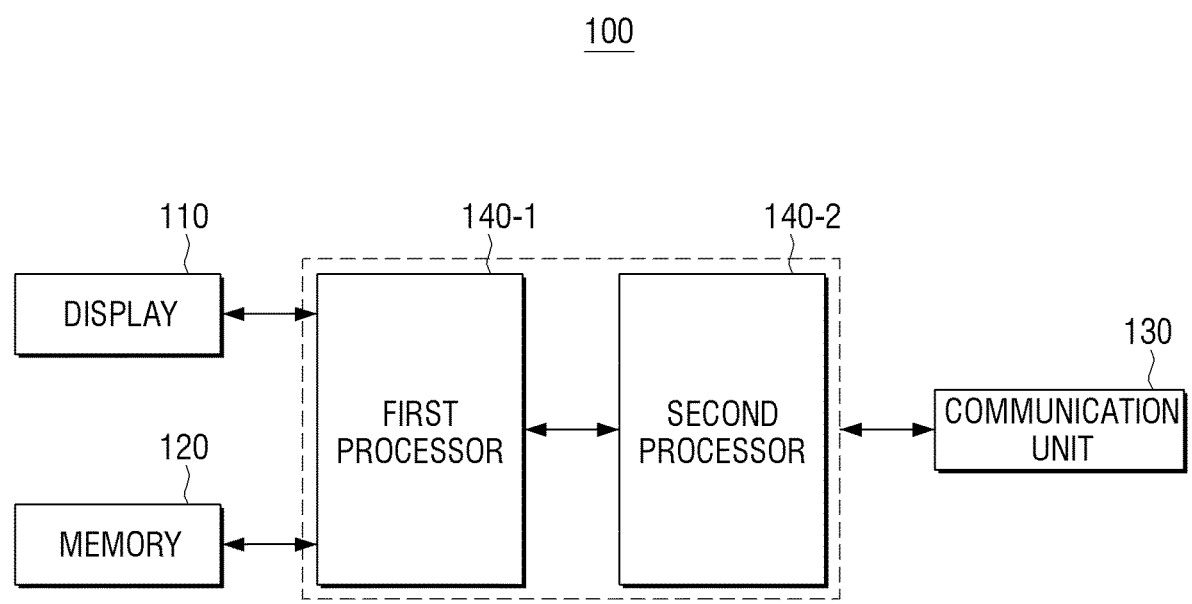

FIG. 2B illustrates a configuration of a display apparatus according to an embodiment of the present disclosure.

Referring to FIG. 2B, the display apparatus 100 may include a first processor 140-1, a second processor 140-2, a display 110, a memory 120, and a communication unit 130. However, all of the elements shown in the drawing are not essential elements.

The first processor 140-1 may control execution of at least one application installed in the display apparatus 100. For example, the first processor 140-1 may generate a fingerprint by capturing an image displayed on the display 110, and may perform ACR. The first processor 140-1 may be implemented in the form of a system on chip (SoC) integrating functions of a central processing unit (CPU), a graphic processing unit (GPU), a communication chip, and a sensor. Alternatively, the first processor 140-1 may be an application processor (AP).

The second processor 140-2 may estimate a type of a content using a data recognition model. The data recognition model may be, for example, a set of algorithms for estimating the type of the content using the information of the content and/or the fingerprint generated from the content, using a result of statistical machine learning.

In addition, the second processor 140-2 may calculate a probability that the content is changed using the data recognition model. The data recognition model may be, for example, a set of algorithms for estimating a probability that the reproduced content is changed using the information of the content (for example, a content reproducing time, a content reproducing channel, a type of a content, or the like), and a viewing history.

In addition, the second processor 140-2 may estimate a content to be reproduced next time after the reproduced content using the data recognition model. The data recognition model may be, for example, a set of algorithms for estimating a probability that the reproduced content is changed using the information of the content (for example, a content reproducing time, a content reproducing channel, a type of a content, or the like), and the viewing history.

The second processor 140-2 may be manufactured in the form of a dedicated hardware chip for AI which performs the functions of estimating the type of the content and estimating the probability that the content is changed using the data recognition model.

According to an embodiment of the present disclosure, the first processor 140-1 and the second processor 140-2 may be interlocked with each other to perform a series of processes as the processor 140 does to generate a fingerprint from the content and recognize the content using ACR as described above with reference to FIG. 2A.

The display 110, the memory 120, and the communication unit 130 correspond to the display 110, the memory 120, and the communication unit 130 in FIG. 2A, respectively, and thus a redundant explanation thereof is omitted.

Figure 3:
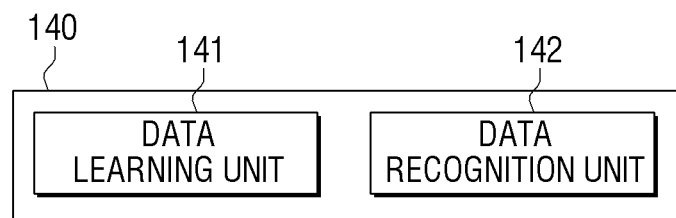
FIG. 3 is a block diagram of a processor according to an embodiment of the present disclosure.

FIG. 3 is a block diagram of a processor according to an embodiment of the present disclosure.

Referring to FIG. 3, the processor 140 according to an embodiment may include a data learning unit 141 and a data recognition unit 142.

The data learning unit 141 may learn in order for the data recognition model to have a criterion for analyzing characteristics of predetermined video/audio data. The processor 140 may generate a fingerprint by analyzing characteristics of each of the captured frames (for example, a change in a frequency of audio data, a change in color of each frame of video data, or a change in a motion vector) according to the learned criterion.

The data learning unit 141 may determine what learning data will be used to determine the characteristics of the screen (or frame) of the captured content. In addition, the data learning unit 141 may learn the criterion for extracting the characteristics of the captured content using the determined learning data.

According to various embodiments of the present disclosure, the data learning unit 141 may learn in order for the data recognition model to have a criterion for estimating a type of the video/audio data based on learning data related to information on the predetermined video/audio data and the type of the video/audio data.

The information on the video/audio data may include, for example, a position of the current frame in the whole video/audio and a reproducing time, which are information on the current frame. In addition, the information on the video/audio may include at least one of a video/audio name, a video/audio ID, a video/audio provider, video/audio series information, a genre, information on whether the video/audio is a real-time broadcast, information on whether the video/audio is a paid content.

The type of the video data may include, for example, drama, advertisement, movie, news, or the like. The type of the audio data may include, for example, music, news, advertisement, or the like. However, the type of the audio/video data is not limited thereto.

According to various embodiments of the present disclosure, the data learning unit 141 may learn in order for the data recognition model to have a criterion for estimating a probability that video/audio data is changed to another video/audio data during reproduction, or a criterion for estimating video/audio data to be reproduced next time after the reproduction is completed, based on learning data related to the information on the predetermined video/audio data, the type of the video/audio data, and a viewing history of the video/audio data (for example, a history of having changed to another video/audio data to view).

The data recognition unit 142 may recognize a situation based on predetermined recognition data using the learned data recognition model. The data recognition unit 142 may obtain the predetermined recognition data according to a predetermined criterion obtained according to learning, and may use the data recognition model using the obtained recognition data as an input value.

For example, using a learned characteristic extraction model, the data recognition unit 142 may extract characteristics on respective frames included in the recognition data, such as a captured content, and may generate a fingerprint. In addition, the data recognition unit 142 may update the data recognition model using output data which is obtained as a result of applying the data recognition model as an input value again.

According to various embodiments of the present disclosure, the data recognition unit 142 may obtain a result of determining the type of the video/audio data by applying, to the data recognition model, the recognition data related to the information on the predetermined video/audio data as an input value.

According to various embodiments of the present disclosure, the data recognition unit 142 may obtain a result of estimating a probability that video/audio data is changed to another video/audio data while the video/audio data is reproduced, or a result of estimating video/audio data to be reproduced next time after the reproduction is completed, by applying, to the data recognition model, the recognition data related to the information on the predetermined video/audio data and the type of the video/audio data as an input value.

At least one of the data learning unit 141 and the data recognition unit 142 may be manufactured in the form of one hardware chip or a plurality of hardware chips and may be mounted in the display apparatus 100. For example, at least one of the data learning unit 141 and the data recognition unit 142 may be manufactured in the form of a dedicated hardware chip for AI, or may be manufactured as a part of an existing generic-purpose processor (for example, a CPU or an AP) or a part of a graphic dedicated processor (for example, a GPU, an ISP), and may be mounted in the above-described various display apparatuses 100.

In this case, the dedicated hardware chip for AI may be a dedicated processor which is specialized in calculation of a probability, and may have higher parallel processing performance than that of the existing general processor and thus can rapidly process an operation task of the field of AI, such as machine learning. When the data learning unit 141 and the data recognition unit 142 are implemented by using a software module (or a program module including instructions), the software module may be stored in a non-transitory computer readable recording medium. In this case, the software module may be provided by an operating system (OS) or may be provided by a predetermined application. Alternatively, a part of the software module may be provided by the OS and the other part may be provided by the predetermined application.

Although FIG. 3 depicts that the data learning unit 141 and the data recognition unit 142 are all mounted in the display apparatus 100, they may be mounted in separate devices. For example, one of the data learning unit 141 and the data recognition unit 12 may be included in the display apparatus 100, and the other one may be included in the server 200. In addition, the data learning unit 141 and the data recognition unit 142 may be connected with each other in a wire or wireless method, and model information established by the data learning unit 141 may be provided to the data recognition unit 142, and data inputted to the data recognition unit 142 may be provided to the data learning unit 141 as additional learning data.

Figure 4A:
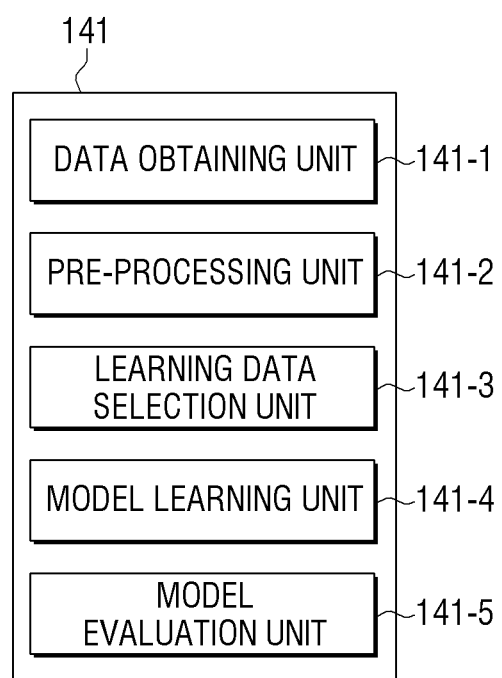
FIG. 4A is a block diagram of a data learning unit according to an embodiment of the present disclosure.

FIG. 4A is a block diagram of a data learning unit according to an embodiment of the present disclosure.

Referring to FIG. 4A, the data learning unit 141 according to an embodiment may include a data obtaining unit 141-1 and a model learning unit 141-4. In addition, the data learning unit 141 may further selectively include at least one of a pre-processing unit 141-2, a learning data selection unit 141-3, and a model evaluation unit 141-5.

The data obtaining unit 141-1 may obtain learning data necessary for determining a situation. For example, the data obtaining unit 141-1 may obtain an image frame by capturing a screen reproduced on the display 110. In addition, the data obtaining unit 141-1 may receive image data from an external device, such as a set-top box. The image data may be formed of a plurality of image frames. In addition, the data obtaining unit 141-1 may receive learning image data from the server 200 or a network, such as the Internet.

The model learning unit 141-4 may learn in order for the data recognition model to have a criterion for determining a situation based on learning data. In addition, the model learning unit 141-4 may learn in order for the data recognition model to have a criterion for selecting what learning data will be used to determine the situation.

For example, the model learning unit 141-4 may learn physical characteristics for distinguishing images by comparing the plurality of image frames. The model learning unit 141-4 may learn a criterion for distinguishing image frames by extracting a ratio between a foreground and a background in the image frame, a size, a location, and arrangement of an object, and characteristic points.

In addition, the model learning unit 141-4 may learn a criterion for identifying a genre of a content including image frames. For example, the model learning unit 141-4 may learn a criterion for identifying frames having a text box on an upper end or a lower of the left of the image frame as one genre. This is because images of a news content have a text box on the upper end or lower end of the left side to show the news content.

According to various embodiments of the present disclosure, the model learning unit 141 may learn in order for the data recognition model to have a criterion for estimating a type of video/audio data based on learning data related to information of predetermined video/audio data and a type of video/audio data.

The information of the video/audio data may include, for example, a position of a current frame in the whole video/audio and a reproducing time, which are information on the current frame. In addition, the information on the video/audio may include at least one of a video/audio name, a video/audio ID, a video/audio provider, video/audio series information, a genre, information on whether the video/audio is a real-time broadcast, information on whether the video/audio is a paid content.

The type of the video data may include, for example, drama, advertisement, movie, news, or the like. The type of the audio data may include, for example, music, news, advertisement, or the like. However, the type of the audio/video data is not limited thereto.

According to various embodiments of the present disclosure, the model learning unit 141 may learn in order for the data recognition model to have a criterion for estimating a probability that video/audio data is changed to another video/audio data during reproduction based on learning data related to the information of the predetermined video/audio data, the type of the video/audio data, and a viewing history of the video/audio data (for example, a history of having changed to another audio/video data or a history of having selected another audio/video data after viewing of the audio/video data was finished), or a criterion for estimating video/audio data to be reproduced next time after the reproduction is completed.

The data recognition model may be an already established model. For example, the data recognition model may be a model which receives basic learning data (for example, a sample image) and is already established.

The data learning unit 141 may further include the pre-processing unit 141-2, the learning data selection unit 141-3, and the model evaluation unit 141-5 in order to improve the result of recognizing of the data recognition model or in order to save resources or time necessary for generating the data recognition model.

The pre-processing unit 141-2 may pre-process the obtained learning data such that the obtained learning data can be used for learning for determining a situation. The pre-processing unit 141-2 may process obtained data in a predetermined format such that the model learning unit 141-4 can use the obtained data for learning for determining a situation.

For example, the pre-processing unit 141-2 may generate image frames of the same format by performing decoding, scaling, noise filtering, resolution conversion, or the like with respect to inputted image data. In addition, the pre-processing unit 141-2 may crop only a specific region included in each of the inputted plurality of image frames. In response to only the specific region being cropped, the display apparatus 100 may distinguish one of the frames from the others by consuming fewer resources.

In another example, the pre-processing unit 141-2 may extract a text region included in the inputted image frames. In addition, the pre-processing unit 141-2 may generate text data by performing optical character recognition (OCR) with respect to the extracted text region. The text data pre-processed as described above may be used to distinguish the image frames.

The learning data selection unit 141-3 may select data which is necessary for learning from among the pre-processed data. The selected data may be provided to the model learning unit 141-4. The learning data selection unit 141-3 may select data which is necessary for learning from among the pre-processed data according to a predetermined criterion for determining a situation. In addition, the learning data selection unit 141-3 may select data according to a predetermined criterion which is determined by learning by the model learning data selection unit 141-3, which will be described below.

For example, at the initial time of learning, the learning data selection unit 141-3 may remove image frames having high similarity from the pre-processed image frames. For example, the learning data selection unit 141-3 may select data having low similarity for initial learning, such that a criterion easy to learn can be learned.

In addition, the learning data selection unit 141-3 may select pre-processed image frames which commonly satisfy one of criteria determined by leaning By doing so, the model learning unit 141-4 may learn a different criterion from the already learned criterion.

The model evaluation unit 141-5 may input evaluation data into the data recognition model, and, in response to a result of recognition outputted from the evaluation data not satisfying a predetermined criterion, may have the model learning unit 141-4 learn again. In this case, the evaluation data may be predetermined data for evaluating the data recognition model.

At an initial recognition model configuration operation, the evaluation data may be image frames representing different content genres. Thereafter, the evaluation data may be substituted with a set of image frames having higher similarity. By doing so, the model evaluation unit 141-5 may verify performance of the data recognition model in phases.

For example, in response to the number or ratio of evaluation data resulting inexact recognition results, from among the recognition results of the learned data recognition model regarding the evaluation data, exceeding a predetermined threshold, the model evaluation unit 141-5 may evaluate that the predetermined criterion is not satisfied. For example, the predetermined criterion may be defined as a ratio of 2%. In this case, in response to the learned data recognition model outputting wrong recognition results with respect to 20 or more evaluation data from among 1000 total evaluation data, the model evaluation unit 141-5 may evaluate that the learned data recognition model is not appropriate.

In response to there being a plurality of learned data recognition models, the model evaluation unit 141-5 may evaluate whether each of the learned data recognition models satisfies the predetermined criterion, and may determine a model satisfying the predetermined criterion as a final data recognition model. In this case, in response to a plurality of models satisfying the predetermined criterion, the model evaluation unit 141-5 may determine any predetermined model or a predetermined number of models as final data recognition models in order from the highest evaluation score.

The data recognition model may be established based on an application field of the recognition model, a purpose of learning, or computer performance of a device. The data recognition model may be based on, for example, a neural network. For example, models, such as a deep neural network (DNN), a recurrent neural network (RNN), a bidirectional recurrent deep neural network (BRDNN) may be used as the data recognition model, but the data recognition model is not limited thereto.

According to various embodiments of the present disclosure, in response to there being a plurality of data recognition models already established, the model learning unit 141-4 may determine a data recognition model having high relevance to inputted learning data and basic learning data as the data recognition model for learning. In this case, the basic learning data may be already classified according to a type of data, and the data recognition model may be already established according to a type of data. For example, the basic learning data may be already classified according to various criteria, such as a region where learning data is generated, a time at which learning data is generated, a size of learning data, a genre of learning data, a generator of learning data, a type of an object in learning data, or the like.

In addition, the model learning unit 141-4 may have the data recognition model learn by using a learning algorithm including an error back propagation or gradient descent method, for example.

For example, the model learning unit 141-4 may have the data recognition model learn through supervised learning which considers learning data for learning to have a determination criterion as an input value. In another example, the model learning unit 141-4 may learn a type of data necessary for determining a situation by itself without separate supervision, thereby having the data recognition model learn through unsupervised learning which finds a criterion for determining a situation. In another example, the model learning unit 141-4 may have the data recognition model learn through reinforcement learning which uses feedback regarding whether a result of determining a situation according to learning is correct.

In addition, in response to the data recognition model being learned, the model learning unit 141-4 may store the learned data recognition model. In this case, the model learning unit 141-4 may store the learned data recognition model in the memory 120 of the display apparatus 100. Alternatively, the model learning unit 141-4 may store the learned data recognition model in the memory of the server 200 connected with an electronic device in a wire or wireless network.

In this case, the memory 120 in which the learned data recognition model is stored may also store instructions or data related to at least one other element of the display apparatus 100. In addition, the memory 120 may store software and/or programs. For example, the programs may include a kernel, middleware, an application programming interface (API), and/or an application program (or an application).

At least one of the data obtaining unit 141-1, the pre-processing unit 141-2, the learning data selection unit 141-3, the model learning unit 141-4, and the model evaluation unit 141-5 included in the data learning unit 141 may be manufactured in the form of at least one hardware chip, and may be mounted in an electronic device. For example, at least one of the data obtaining unit 141-1, the pre-processing unit 141-2, the learning data selection unit 141-3, the model learning unit 141-4, and the model evaluation unit 141-5 may be manufactured in the form of a dedicated hardware chip for AI, or may be manufactured as a part of an existing generic-purpose processor (for example, a CPU or an AP) or a graphic dedicated processor (for example, a GPU, an ISP), and may be mounted in the above-described various display apparatuses 100.

In addition, the data obtaining unit 141-1, the pre-processing unit 141-2, the learning data selection unit 141-3, the model learning unit 141-4, and the model evaluation unit 141-5 may be mounted in one electronic device, or may be respectively mounted in separate electronic devices. For example, a portion of the data obtaining unit 141-1, the pre-processing unit 141-2, the learning data selection unit 141-3, the model learning unit 141-4, and the model evaluation unit 141-5 may be included in the display apparatus 100, and the other portion may be included in the server 200.

At least one of the data obtaining unit 141-1, the pre-processing unit 141-2, the learning data selection unit 141-3, the model learning unit 141-4, and the model evaluation unit 141-5 may be implemented by using a software module. When at least one of the data obtaining unit 141-1, the pre-processing unit 141-2, the learning data selection unit 141-3, the model learning unit 141-4, and the model evaluation unit 141-5 is implemented by using a software module (or a program module including instructions), the software module may be stored in a non-transitory computer readable recording medium. At least one software module may be provided by an OS or may be provided by a predetermined application. Alternatively, a portion of at least one software module may be provided by the OS, and the other portion may be provided by the predetermined application.

Figure 4B:
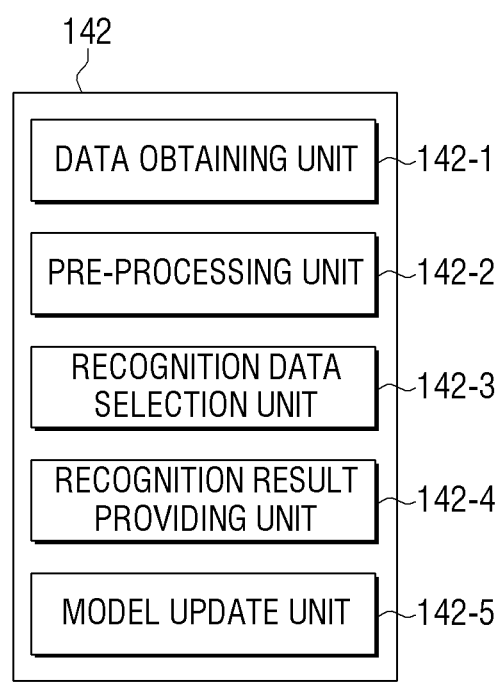
FIG. 4B is a block diagram of a data recognition unit according to an embodiment of the present disclosure.

FIG. 4B is a block diagram of a data recognition unit according to an embodiment of the present disclosure.

Referring to FIG. 4B, the data recognition unit 142 according to an embodiment may include a data obtaining unit 142-1 and a recognition result providing unit 142-4. In addition, the data recognition unit 142 may further selectively include at least one of a pre-processing unit 142-2, a recognition data selection unit 142-3, and a model update unit 142-5.

The data obtaining unit 142-1 may obtain recognition data which is necessary for determining a situation.

The recognition result providing unit 142-4 may determine a situation by applying selected recognition data to the data recognition model. The recognition result providing unit 142-4 may provide a recognition result according to a purpose of recognition of inputted data. The recognition result providing unit 142-4 may apply selected data to the data recognition model by using recognition data selected by the recognition data selection unit 142-3 as an input value. In addition, the recognition result may be determined by the data recognition model.

For example, the recognition result providing unit 142-4 may classify selected image frames according to a classification criterion which is determined at the data recognition model. In addition, the recognition result providing unit 142-4 may output a classified characteristic value such that the processor 140 generates a fingerprint. In another example, the recognition result providing unit 142-4 may apply the selected image frames to the data recognition model, and may determine a genre of a content to which the image frames belong. In response to the genre of the content being determined, the processor 140 may request fingerprint data of granularity corresponding to the content genre from the server 200.

According to various embodiments of the present disclosure, the recognition result providing unit 142-4 may obtain a result of determining a type of video/audio data by using recognition data related to information of predetermined video/audio data as an input value.

The information of the video/audio data may include, for example, a position of a current frame in the whole video/audio and a reproducing time, which are information on the current frame. In addition, the information on the video/audio may include at least one of a video/audio name, a video/audio ID, a video/audio provider, video/audio series information, a genre, information on whether the video/audio is a real-time broadcast, information on whether the video/audio is a paid content.

The type of the video data may include, for example, drama, advertisement, movie, news, or the like. The type of the audio data may include, for example, music, news, advertisement, or the like. However, the type of the audio/video data is not limited thereto.

According to various embodiments of the present disclosure, the recognition result providing unit 142-4 may obtain a result of estimating a probability that the video/audio data is changed to another video/audio data during production, or a result of estimating video/audio data to be reproduced next time after the reproduction is completed, by using recognition data related to the information on the predetermined video/audio data and the type of the video/audio data as an input value.

The data recognition unit 142 may further include the pre-processing unit 142-2, the recognition data selection unit 142-3, and the model update unit 142-5 in order to improve the result of recognizing of the data recognition model or in order to save resources or time necessary for providing the recognition result.

The pre-processing unit 142-2 may pre-process obtained data such that the obtained recognition data can be used to determine a situation. The pre-processing unit 142-2 may process the obtained recognition data in a predetermined format such that the recognition result providing unit 142-4 can use the obtained recognition data to determine a situation.

The recognition data selection unit 142-3 may select recognition data which is necessary for determining a situation from among the pre-processed data. The selected recognition data may be provided to the recognition result providing unit 142-4. The recognition data selection unit 142-3 may select recognition data necessary for determining a situation from among the pre-processed data according to a predetermined selection criterion for determining a situation. In addition, the recognition data selection unit 142-3 may select data according to a predetermined selection criterion according to learning by the above-described model learning unit 141-4.

The model update unit 142-5 may control to update the data recognition model based on evaluation on the recognition result provided by the recognition result providing unit 142-4. For example, the model update unit 142-5 may provide the recognition result provided by the recognition result providing unit 142-4 to the model learning unit 141-4, such that the model learning unit 141-4 controls to update the data recognition model.

At least one of the data obtaining unit 142-1, the pre-processing unit 142-2, the recognition data selection unit 142-3, the recognition result providing unit 142-4, and the model update unit 142-5 included in the data recognition unit 142 may be manufactured in the form of at least one hardware chip, and may be mounted in an electronic device. For example, at least one of the data obtaining unit 142-1, the pre-processing unit 142-2, the recognition data selection unit 142-3, the recognition result providing unit 142-4, and the model update unit 142-5 may be manufactured in the form of a dedicated hardware chip for AI, or may be manufactured as a part of an existing generic-purpose processor (for example, a CPU or an AP) or a graphic dedicated processor (for example, a GPU, an ISP), and may be mounted in the above-described various display apparatuses 100.

In addition, the data obtaining unit 142-1, the pre-processing unit 142-2, the recognition data selection unit 142-3, the recognition result providing unit 142-4, and the model update unit 142-5 may be mounted in one electronic device, or may be respectively mounted in separate electronic devices. For example, a portion of the data obtaining unit 142-1, the pre-processing unit 142-2, the recognition data selection unit 142-3, the recognition result providing unit 142-4, and the model update unit 142-5 may be included in the display apparatus 100, and the other portion may be included in the server 200.

At least one of the data obtaining unit 142-1, the pre-processing unit 142-2, the recognition data selection unit 142-3, the recognition result providing unit 142-4, and the model update unit 142-5 may be implemented by using a software module. When at least one of the data obtaining unit 142-1, the pre-processing unit 142-2, the recognition data selection unit 142-3, the recognition result providing unit 142-4, and the model update unit 142-5 is implemented by using a software module (or a program module including instructions), the software module may be stored in a non-transitory computer readable recording medium. At least one software module may be provided by an OS or may be provided by a predetermined application. Alternatively, a portion of at least one software module may be provided by the OS, and the other portion may be provided by the predetermined application.

Figure 5:
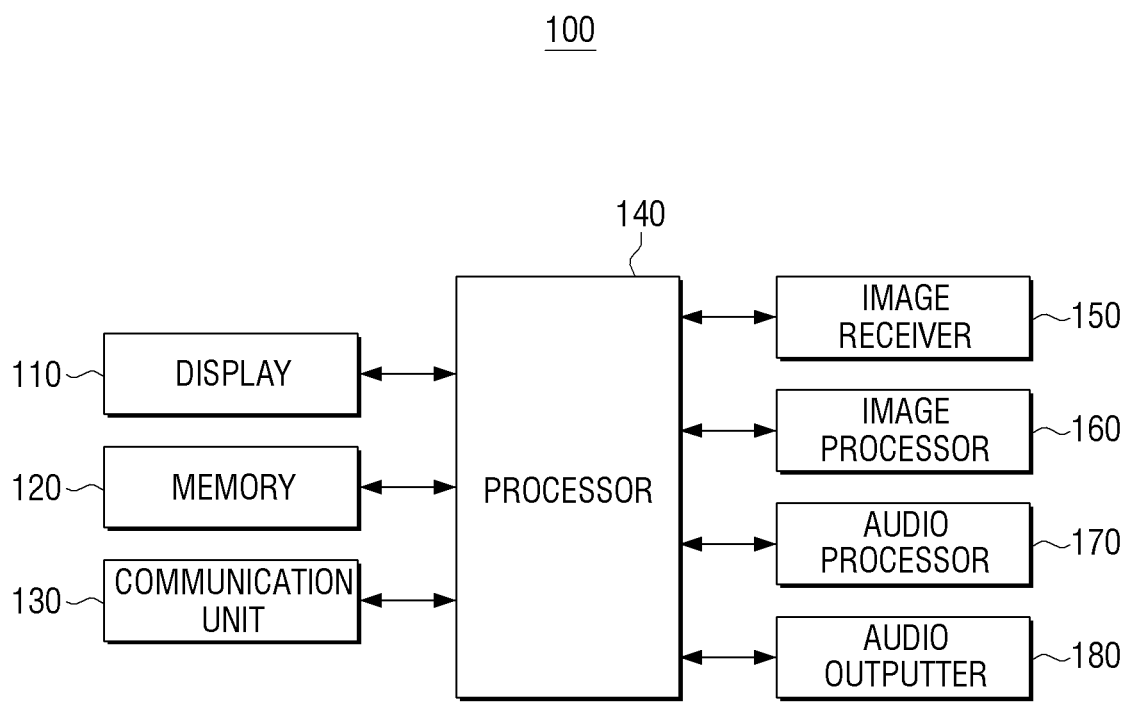
FIG. 5 is a block diagram illustrating a configuration of a display apparatus according to an embodiment of the present disclosure.

FIG. 5 is a block diagram illustrating a configuration of a display apparatus according to an embodiment of the present disclosure.

Referring to FIG. 5, the display apparatus 100 may include a display 110, a memory 120, a communication unit 130, a processor 140, an image receiver 150, an image processor 160, an audio processor 170, and an audio outputter 180.

The display 110 may display various image contents, information, a UI, or the like which are provided by the display apparatus 100. Specifically, the display 110 may display an image content and a UI window which are provided by an external device (for example, a set-top box). For example, the UI window may include EPG, a menu for selecting a content to be reproduced, content-related information, an additional application execution button, a guide message, a notification message, a function setting menu, a calibration setting menu, an operation execution button, or the like. The display 110 may be implemented in various forms, such as a liquid crystal display (LCD), an organic light emitting diode (OLED), an active-matrix OLED (AM-OLED), a plasma display panel (PDP), or the like.

The memory 120 may store various programs and data necessary for operations of the display apparatus 100. The memory 120 may be implemented in the form of a flash memory, a hard disk, or the like. For example, the memory 120 may include a read only memory (ROM) for storing a program for performing operations of the display apparatus 100, and a random access memory (RAM) for temporarily storing data which is accompanied by the operations of the display apparatus 100. In addition, the memory 120 may further include an electrically erasable and programmable ROM (EEPROM) for storing various reference data.

The memory 120 may store a program and data for configuring various screens to be displayed on the display 110. In addition, the memory 120 may store a program and data for performing a specific service. For example, the memory 120 may store a plurality of fingerprints, a viewing history, content information, or the like. The fingerprint may be generated by the processor 140 or may be received from the server 200.

The communication unit 130 may communicate with the server 200 according to various types of communication methods. The communication unit 130 may exchange fingerprint data with the server 200 connected thereto in a wire or wireless manner. In addition, the communication unit 130 may receive, from the server 200, content information, a control signal for changing a content recognition period, additional information, information on a product appearing in a content, or the like. In addition, the communication unit 130 may stream image data from an external server. The communication unit 130 may include various communication chips for supporting wire/wireless communication. For example, the communication unit 130 may include a chip which operates in a wire local area network (LAN), wireless LAN (WLAN), Wi-Fi, Bluetooth (BT), or near field communication (NFC) method.

The image receiver 150 may receive image content data through various sources. For example, the image receiver 150 may receive broadcasting data from an external broadcasting station. In another example, the image receiver 150 may receive image data from an external device (for example, a set-top box, a digital versatile disc (DVD) player), or may receive image data which is streamed from an external server through the communication unit 130.

The image processor 160 performs image processing with respect to image data received from the image receiver 150. The image processor 160 may perform various image processing operations, such as decoding, scaling, noise filtering, frame rate conversion, or resolution conversion, with respect to the image data.

The audio processor 170 may perform processing with respect to audio data. For example, the audio processor 170 may perform decoding, amplification, noise filtering, or the like with respect to audio data.

The audio outputter 180 may output not only various audio data processed at the audio processor, but also various notification sounds or voice messages.

The processor 140 may control the above-described elements of the display apparatus 100. For example, the processor 140 may receive a fingerprint or content information through the communication unit 130. In addition, the processor 140 may adjust a content recognition period using the received content information. The processor 140 may be implemented by using a single CPU to perform a control operation, a search operation, or the like, and may be implemented by using a plurality of processors and an IP performing a specific function.

Hereinafter, the operation of the processor 140 will be described below with reference to drawings.

Figure 6:
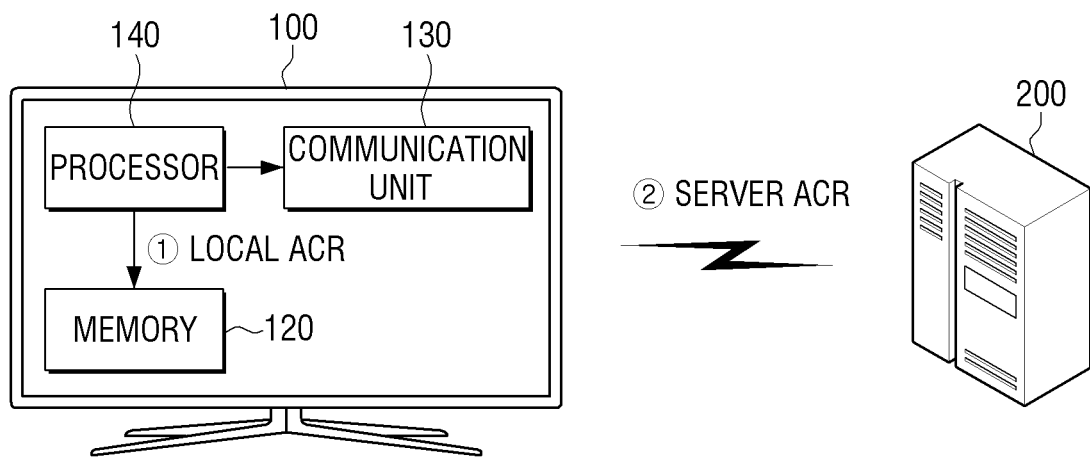
FIG. 6 is a view illustrating hybrid automatic content recognition (ACR) according to an embodiment of the present disclosure.

FIG. 6 is a view illustrating hybrid ACR according to an embodiment of the present disclosure.

Referring to FIG. 6, the hybrid ACR refers to a method of using a combination of local ACR, according to which the processor 140 recognizes a reproduced content using fingerprint information stored in the memory 120, and server ACR according to which a content is recognized through information received from the server 200. When the local ACR and the server ACR are combined, a load on the server 200 can be reduced and the display apparatus 100 can recognize what content is being reproduced with precision.

The processor 140 may recognize what content is being currently reproduced, and may adjust to perform ACR with appropriate precision based on the result of recognition. For example, the processor 140 may adjust a content recognition period based on content information, and may determine a content to be received from the server 200 in advance and stored, and a quantity of fingerprints on the content.

Referring to FIG. 6, the processor 140 may extract a characteristic of a screen of a currently reproduced content, and may generate a fingerprint. In addition, the processor 140 may search whether there is a fingerprint matching the generated fingerprint from among a plurality of fingerprints stored in the memory 120 (CD local ACR).

In response to a fingerprint matching the generated fingerprint being searched in the memory 120, the processor 140 may recognize the currently reproduced content based on information on the content corresponding to the searched fingerprint. For example, the information on the content corresponding to the fingerprint may include a position of a current frame in the whole content, a reproducing time, or the like, which are information on the current frame. In addition, the information on the content corresponding to the fingerprint may include at least one of a content name, a content ID, a content provider, content series information, a genre, information on whether the content is a real-time broadcast, and information on whether the content is a paid content.

In response to the local ACR succeeding as described above, the processor 140 does not have to try to perform server ACR, and thus a load on the server 200 can be reduced. For appropriate local ACR, the memory 120 should store necessary fingerprint information and content information. This will be described again below.

On the other hand, in response to the fingerprint matching the generated fingerprint not being searched in the memory 120, the processor 140 may control the communication unit 130 to transmit a query for requesting information on the currently reproduced content to the server 200 (CD server ACR). For example, the query may include the generated fingerprint, a viewing history, information on the display apparatus 100, or the like.

The server 200 may establish a fingerprint database regarding various image contents in advance in case a server ACR request is received from the display apparatus 100. The server 200 may analyze image contents and may extract characteristics of all image frames. In addition, the server 200 may generate fingerprints for distinguishing image frames from one another using the extracted characteristics. The server 200 may establish the database using the generated fingerprints.

The server 200 may extract at least one fingerprint from the requested query. In addition, the server 200 may search the extracted fingerprint in the established database, and may recognize what content is being currently reproduced by the display apparatus 100. The server 200 may transmit recognized content information to the display apparatus 100. In addition, the server 200 may add the recognized content information to a viewing history of each display apparatus and may manage the viewing history.

In addition, the processor 140 may control the communication unit 130 to receive the information on the currently reproduced content and the fingerprint of the currently reproduced content from the server 200 in response to the query. Herein, the fingerprint of the currently reproduced content may be a fingerprint regarding frames which are positioned after a currently displayed frame in time in the whole content. Since the processor 140 knows time indicated by the position of the currently displayed frame in the whole content based on the fingerprint included in the query, the processor 140 may receive, from the server 200, a fingerprint on frames which are expected to be reproduced after the currently displayed frame.

To appropriately combine the local ACR and the server ACR, the processor 140 may determine a fingerprint to be received from the server 200 in advance for the local ACR based on at least one of the result of content recognition and the viewing history, and may determine whether to change a content recognition period.

According to an embodiment of the present disclosure, the processor 140 may determine a type of the content based on the information on the currently reproduced content. In addition, the processor 140 may change the content recognition period according to the determined type of the content. The type of the content may be classified according to a criterion, such as details of the content, a genre, information on whether the content is a real-time broadcast, an importance, or the like.

According to another embodiment of the present disclosure, the processor 140 may estimate the type of the content using a data recognition model which is set to estimate a type of a content based on information on the content. The data recognition model set to estimate a type of a content may be, for example, a data recognition model that learns to have a criterion for estimating a type of a content (for example, video/audio data) based on learning data related to information of a content (for example, video/audio data) and a type of a content (for example, video/audio data).

FIGS. 7A and 7B are views illustrating fingerprint information having different granularities according to an embodiment of the present disclosure.

Referring to FIGS. 7A and 7B, for example, in response to it being recognized that a news content or an advertisement content is being reproduced, the processor 140 may reduce the content recognition period. Since the news content or the advertisement content frequently changes details thereof, the processor 140 may need to exactly recognize the reproduced content. For example, the processor 140 may set the content recognition period such that the processor 140 tries to recognize the content in every frame. In this case, as shown in FIG. 7A, the processor 140 may request fingerprint information on all frames to be reproduced after the currently displayed frame from the server 200.

In another example, in response to it being recognized that a broadcast program content or a movie content is being reproduced, the processor 140 may increase the content recognition period. Regarding the broadcast program content or the movie content, the processor 140 does not need to grasp details included in each frame and may only grasp whether the same content is continuously reproduced. Accordingly, the processor 140 may request that only the frame to be displayed at time corresponding to the content recognition period from among the frames to be reproduced after the currently displayed frame includes fingerprint information. In the example of FIG. 7B, since fingerprint information is required only once every fourth frame, the granularity of the fingerprint is lower than that of FIG. 7A.

According to an embodiment of the present disclosure, the processor 140 may determine the content recognition period by analyzing an application which is executed while the user of the display apparatus 100 is viewing a content. For example, in the case of a drama content, the processor 140 may normally set the content recognition period to be long. However, in response to it being determined that there is a history that the user has executed a shopping application while viewing a drama and has shopped for PPL products, the processor 140 may reduce the content recognition period regarding the drama content. The processor 140 may determine which frame of the drama content shows a PPL product, and may control the display 110 to display a relevant advertisement with the drama content. In addition, the processor 140 may control the display 110 to display a UI for immediately executing a shopping application.

As described above, the processor 140 may learn a criterion for determining the content recognition period based on viewing history information and information on an executed additional application. By doing so, the processor 140 may personalize the criterion for determining the content recognition period to each user. When learning the criterion for determining the content recognition period, the processor 140 may use a learning scheme by AI, such as the above-described unsupervised learning.

According to an embodiment of the present disclosure, the processor 140 may differently determine a quantity of fingerprints to be requested from the server in advance according to the recognized content. In addition, the processor 140 may determine a quantity of fingerprints regarding subsequent frames on the currently reproduced content according to the recognized type of the content and the determined content recognition period.

The number of frames to be received from the server 200 in advance and stored may vary according to the recognized type of the content. For example, in the case of VOD or DVR, the server 200 may have information on all image frames, but in the case of a live broadcast, the server 200 may only receive image information of a few seconds (for example, information of hundreds of image frames in the case of 60 Hz) before the display apparatus 100 does. Since there are fingerprints corresponding to respective frames, the quantity of fingerprints that the display apparatus 100 receives from the server 200 in advance and stores may also vary.

For example, in response to it being determined that the recognized type of the content is a drama content and thus the content is set to be recognized every 30 seconds, the processor 140 may determine the quantity of fingerprints to be requested to 0. Since the server 200 does not have a fingerprint corresponding to a frame to be reproduced after 30 seconds in a live broadcast, the processor 140 may omit an unnecessary communicating process.

According to an embodiment of the present disclosure, the processor 140 may change the content recognition period based on information on the recognized content and the viewing history. The viewing history may include a content that the user has viewed, a viewing time, and an additional application which has been executed during viewing time.

FIG. 8 is a view illustrating viewing history information according to an embodiment of the present disclosure.

Referring to FIG. 8, the processor 140 may determine whether the currently reproduced content will be continuously reproduced or another content will be reproduced by comparing the recognized current content and the viewing history. In addition, the processor 140 may change the content recognition period according to a probability that another content is reproduced. In addition, the processor 140 may request information on a content that is expected to be reproduced next time from the server 200, and may receive information necessary for local ACR from the server 200 in advance. By doing so, a probability that server ACR is performed can be reduced, and thus a load on the server 200 can be reduced, and also, the display apparatus 100 can recognize the content precisely.

According to various embodiments of the present disclosure, the processor 140 may estimate a probability that another content is reproduced or estimate a content which is expected to be reproduced next time, using a data recognition model which is set to estimate a probability that another content is reproduced during production or to estimate a content which is expected to be reproduced next time after the reproduction is completed, based on the information of the reproduced content and the type of the content.

The data recognition model which is set to estimate a probability that another content is reproduced during reproduction or to estimate a content which is expected to be reproduced next time after the reproduction is completed may estimate a probability that another content is reproduced during reproduction or estimate a content which is expected to be reproduced next time, based on learning data related to the information of the content (for example, video/audio data), the type of the content (for example, video/audio data), and a viewing history of the content (for example, video/audio data) (for example, a history of having changed to another video/audio data).

For example, referring to the viewing history of FIG. 8, the user of the display apparatus 100 usually views a news content on channel 3 from 17:00 to 18:00. When a content currently recognized at 17:30 is a music content on channel 2, the processor 140 may determine that there is a high probability that the channel is changed. Therefore, the processor 140 may adjust the content recognition period to be short and may frequently check whether the reproduced content is changed.

According to an embodiment of the present disclosure, the processor 140 may receive additional information related to the content from the server 200 with the fingerprint. For example, the additional information may include a content name, a content reproducing time, a content provider, information on a PPL product appearing in a content, an advertisement related to PPL production information, an executable additional application, or the like.

Figure 9:
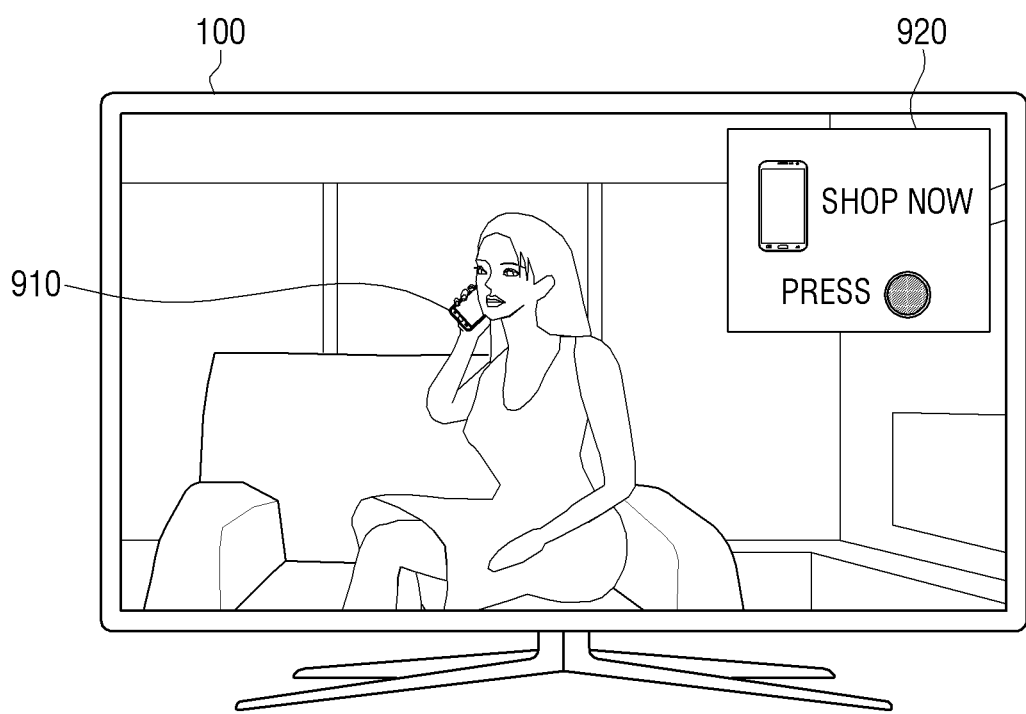
FIG. 9 is a view illustrating display of additional information with a content according to an embodiment of the present disclosure.

FIG. 9 is a view illustrating display of additional information with a content according to an embodiment of the present disclosure.

Referring to FIG. 9, for example, the processor 140 may receive additional information indicating that a PPL product 910 is included in a specific image frame. In addition, the processor 140 may control the display 110 to display a UI 920 including the received additional information with the content. The UI 920 may include a photo of the PPL product 910, a guide message, an additional application execution button, or the like.

According to the above-described embodiments of the present disclosure, the display apparatus 100 may reduce a load on the server 200 by dynamically adjusting the content recognition period, while performing ACR precisely.

Figure 10:
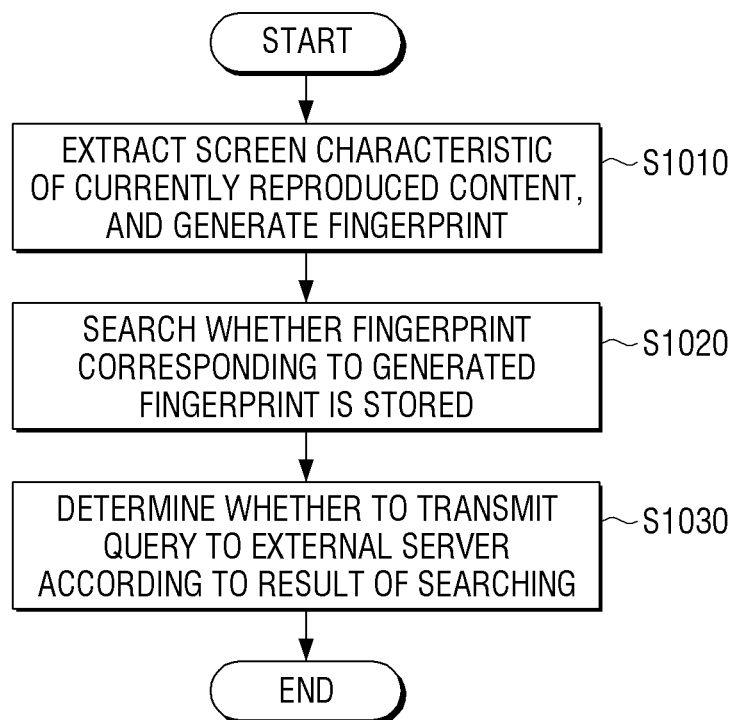
FIGS. 10, 11, 12A, 12B, 13A, 13B, 14A, 14B, 15A, and 15B are flowcharts illustrating a content recognizing method of a display apparatus according to various embodiments of the present disclosure.

FIG. 10 is a flowchart illustrating a content recognizing method of a display apparatus according to an embodiment of the present disclosure.

Referring to FIG. 10, the display apparatus 100 may capture a screen of a currently reproduced content, first. In addition, the display apparatus 100 may extract a characteristic from the captured screen, and may generate a fingerprint using the extracted characteristic at operation S1010. The fingerprint is identification information for distinguishing one image from the other images. Specifically, the fingerprint is characteristic data which is extracted from a video or audio signal included in a frame.

According to various embodiments of the present disclosure, the display apparatus 100 may generate the fingerprint using the data recognition model described above with reference to FIGS. 3 to 4B.

The display apparatus 100 may search whether a fingerprint matching the generated fingerprint is stored in the display apparatus 100 at operation S1020. For example, the display apparatus 100 may perform local ACR first. In response to the local ACR succeeding, the display apparatus 100 may recognize what content is currently reproduced without transmitting a query to the server 200. Since an inner storage space of the display apparatus 100 is limited, the display apparatus 100 should appropriately select fingerprint information to be received in advance and stored.

The display apparatus 100 may determine whether to transmit a query including the generated fingerprint to the external server 200 according to a result of searching, that is, a result of local ACR at operation S1030.

Figure 11:
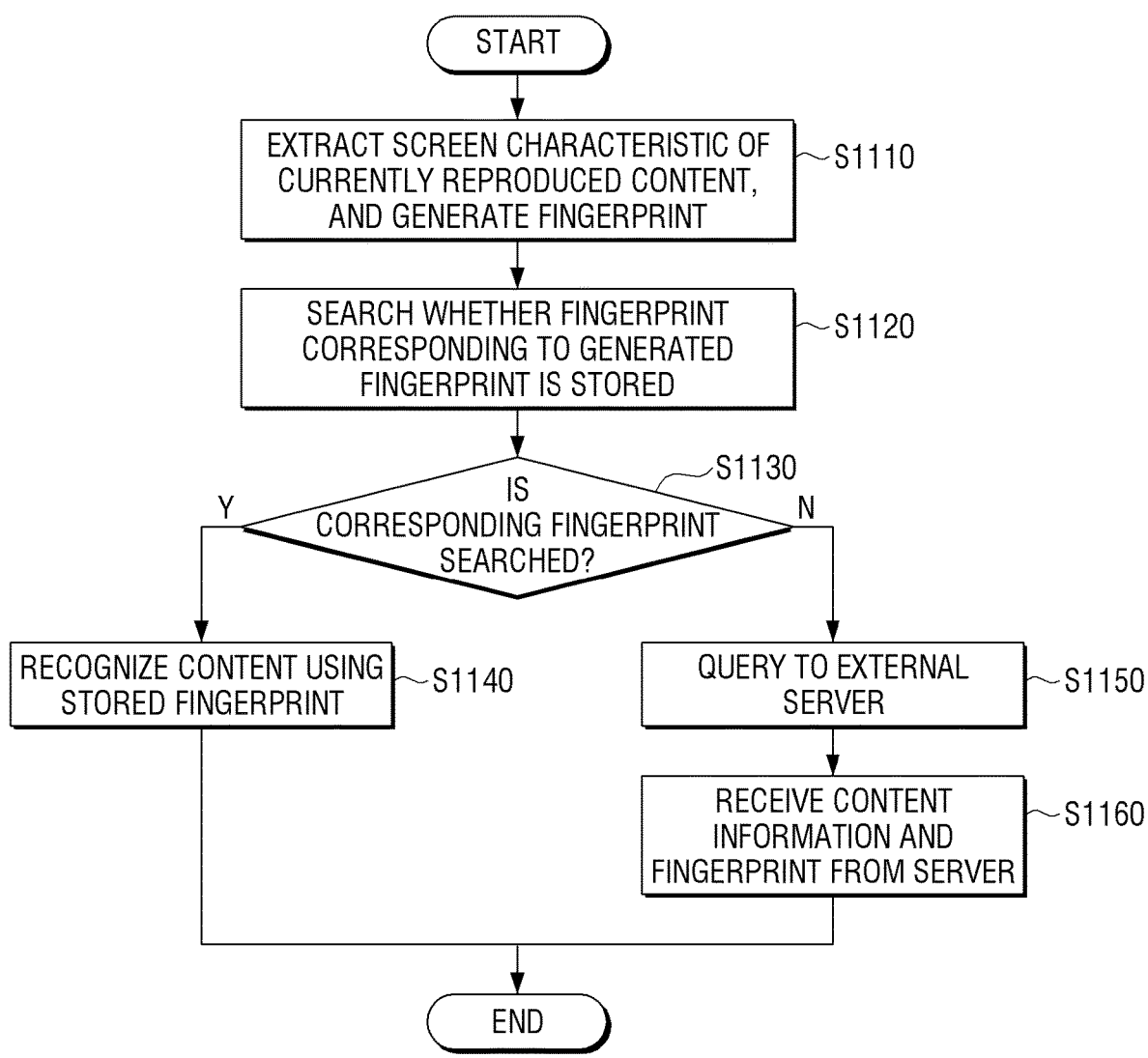

FIG. 11 is a flowchart illustrating a content recognizing method of a display apparatus according to an embodiment of the present disclosure.

Referring to FIG. 11, since operations S1110 and S1120 correspond to operations S1010 and S1020, a redundant explanation is omitted.

In response to the fingerprint matching the generated fingerprint being searched in the display apparatus 100 at operation S1130-Y, the display apparatus 100 may recognize the currently reproduced content using the stored fingerprint at operation S1140.

On the other hand, in response to the fingerprint matching the generated fingerprint not being searched at operation S1130-N, the display apparatus 100 may transmit a query for requesting information on the currently reproduced content to the external server 200 at operation S1150. The display apparatus 100 may receive content information from the server 200 at operation S1160. In addition, the display apparatus 100 may further receive a fingerprint regarding a content which is expected to be reproduced next time from the server 200. For example, the display apparatus 100 may receive a fingerprint regarding a frame which is positioned after a currently reproduced frame in time in the whole content, and a fingerprint regarding a frame of another content which is expected to be reproduced next time.

As described above, the display apparatus 100 may recognize what content is currently reproduced through local ACR or server ACR. Hereinafter, an operation of the display apparatus after a content is recognized will be described.

Figure 12A:
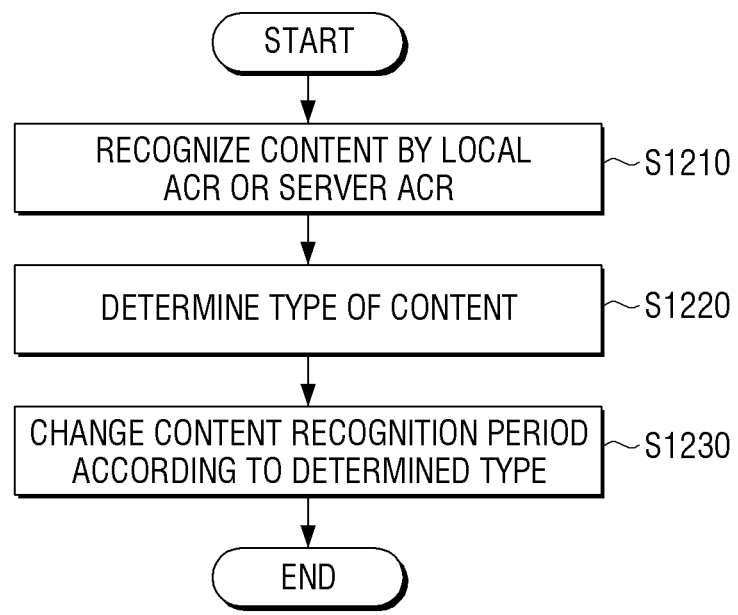

FIG. 12A is a view illustrating a method for changing a content recognition period of a display apparatus according to an embodiment of the present disclosure.

Referring to FIG. 12A, the display apparatus 100 may recognize a currently reproduced content at operation S1210. In addition, the display apparatus 100 may determine a type of the content using information of the recognized content at operation S1220. For example, the type of the content may be classified based on a criterion, such as details of the content, a genre, information whether the content is a real-time broadcast, an importance, or the like. The criterion for classifying the type of the content may be learned by the display apparatus 100 itself by using AI (for example, the data recognition model described in FIGS. 3 to 4B).

In addition, the display apparatus 100 may change a content recognition period according to the determined type of the content at operation S1230. For example, in the case of a news content or an advertisement content which frequently changes details of the reproduced content, the display apparatus 100 may set the content recognition period to be short. In addition, in the case of a VOD content which just requires a decision on whether a currently reproduced content is continuously reproduced, the display apparatus 100 may set the content recognition period to be long.

This criterion may vary according to a personal viewing taste. The display apparatus 100 may set a personalized criterion using a viewing history. The display apparatus 100 may learn this criterion by itself using an unsupervised learning method.

Figure 12B:
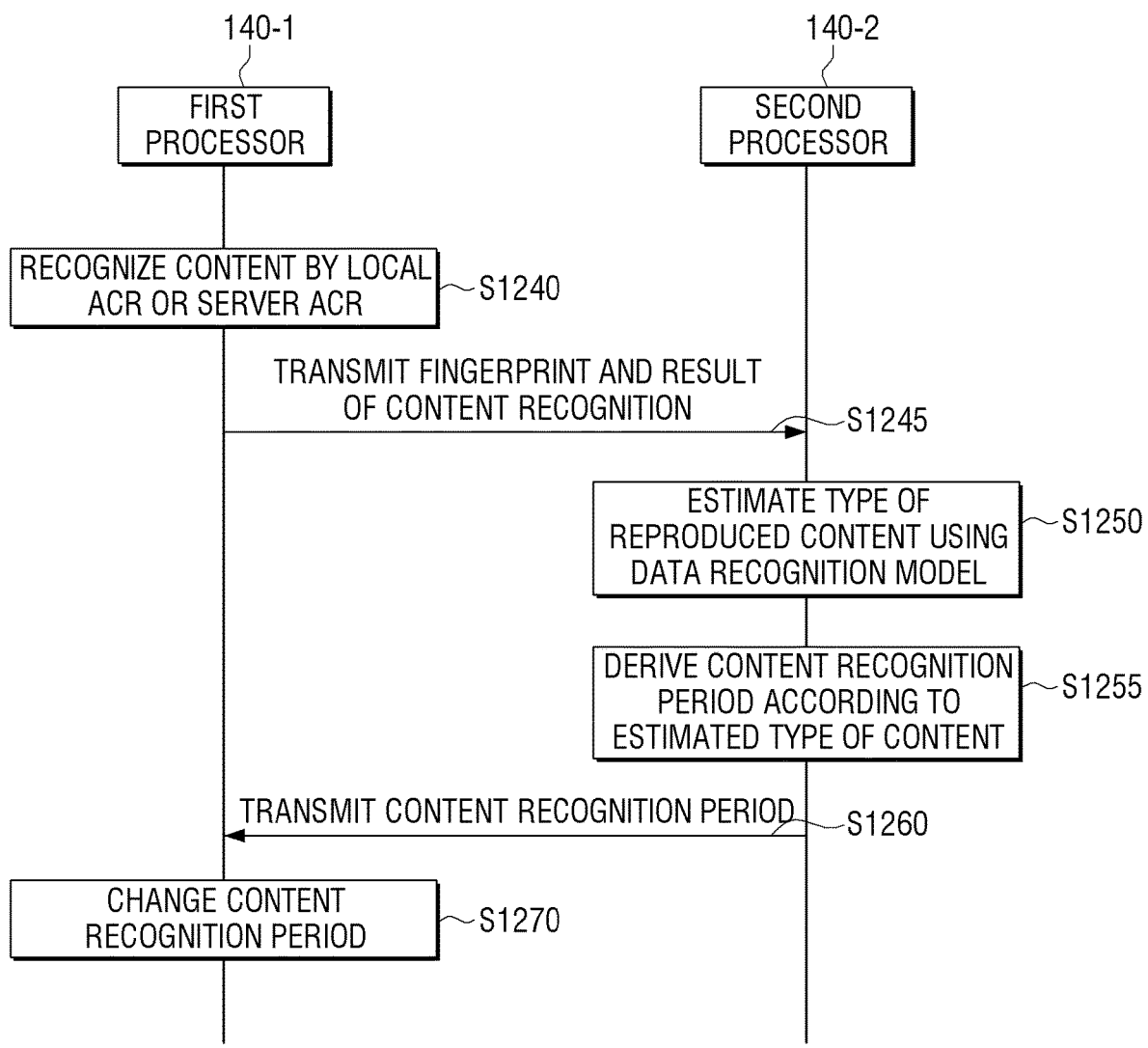

FIG. 12B is a view illustrating a method for changing a content recognition period of a display apparatus according to an embodiment of the present disclosure.

Referring to FIG. 12B, the first processor 140-1 may control to execute at least one application installed in the display apparatus 100. For example, the first processor 140-1 may capture an image displayed on the display and generate a fingerprint, and may perform ACR.

The second processor 140-2 may estimate a type of a content using a data recognition model. The data recognition model may be, for example, a set of algorithms for estimating a type of a content using information of the content and/or a fingerprint generated from the content, using a result of statistical machine learning.

Referring to FIG. 12B, the first processor 140-1 may recognize a currently reproduced content at operation S1240. The first processor 140-1 may recognize a content using local ACR or server ACR, for example.

The first processor 140-1 may transmit a result of content recognition to the second processor 140-2 at operation S1245. For example, the first processor 140-1 may transmit the result of content recognition to the second processor 140-2 to request the second processor 140-2 to estimate a type of the reproduced content.

The second processor 140-2 may estimate the type of the reproduced content using the data recognition model at operation S1250. For example, the data recognition model may estimate the type of the content (for example, video/audio data) based on learning data related to information of the content (for example, video/audio data) and the type of the content (for example, video/audio data).

The second processor 140-2 may derive a recognition period of the content according to the estimated type of the content at operation S1255. For example, in the case of a news content or an advertisement content which frequently changes details of the reproduced content, the display apparatus 100 may set the content recognition period to be short. In addition, in the case of a VOD content which just requires a decision on whether a currently reproduced content is continuously reproduced, the display apparatus 100 may set the content recognition period to be long.

The second processor 140-2 may transmit the derived content recognition period to the first processor 140-1 at operation S1260. The first processor 140-1 may change the content recognition period based on the received content recognition period at operation S1270.

According to various embodiments of the present disclosure, the first processor 140-1 may receive the estimated type of the content from the second processor 140-2, and may perform at operation S1255.

Figure 13A:
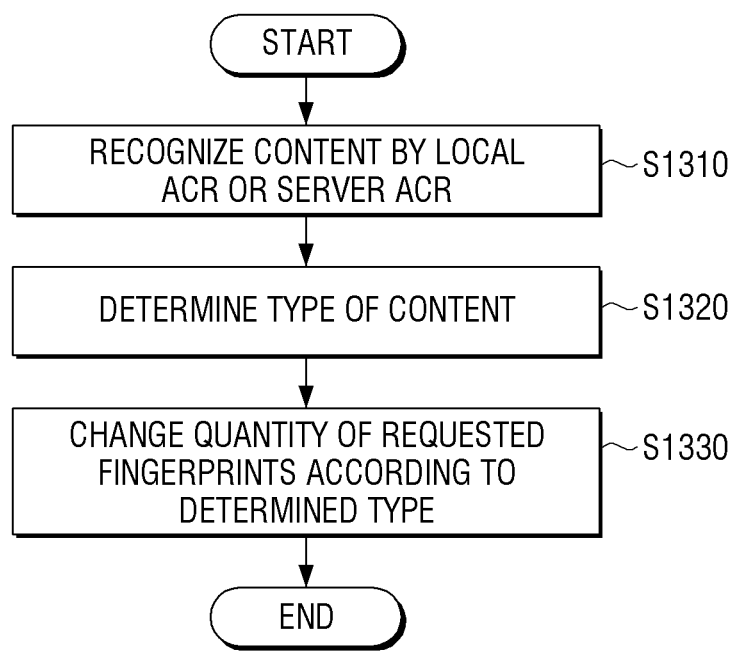

FIG. 13A is a view illustrating a method for determining a quantity of fingerprints to be requested by a display apparatus according to an embodiment of the present disclosure.

Referring to FIG. 13A, the display apparatus 100 may recognize a currently reproduced content at operation S1310. In addition, the display apparatus 100 may determine a type of the content using information of the recognized content at operation S1320. For example, the display apparatus 100 may determine (or estimate) the type of the content using a data recognition model (for example, the data recognition model described in FIG. 3 to FIG. 4B).

Similarly to the method for changing the content recognition period according to the determined type of the content, the display apparatus 100 may determine a quantity of fingerprints to be received from the server 200 in advance at operation S1330. Since the number of image frames existing in the server 200 varies according to the type of the content, the number of fingerprints corresponding to the respective frames and existing in the server 200 may also vary according to the type of the content.

The display apparatus 100 may determine the quantity of fingerprints to be received by considering a genre of the content, a viewing history, information on whether the content is a live broadcast, or the like. In response to the determined quantity of fingerprints being received, the display apparatus 100 may perform optimized local ACR while minimizing the quantity of fingerprints stored in the display apparatus 100.

Figure 13B:
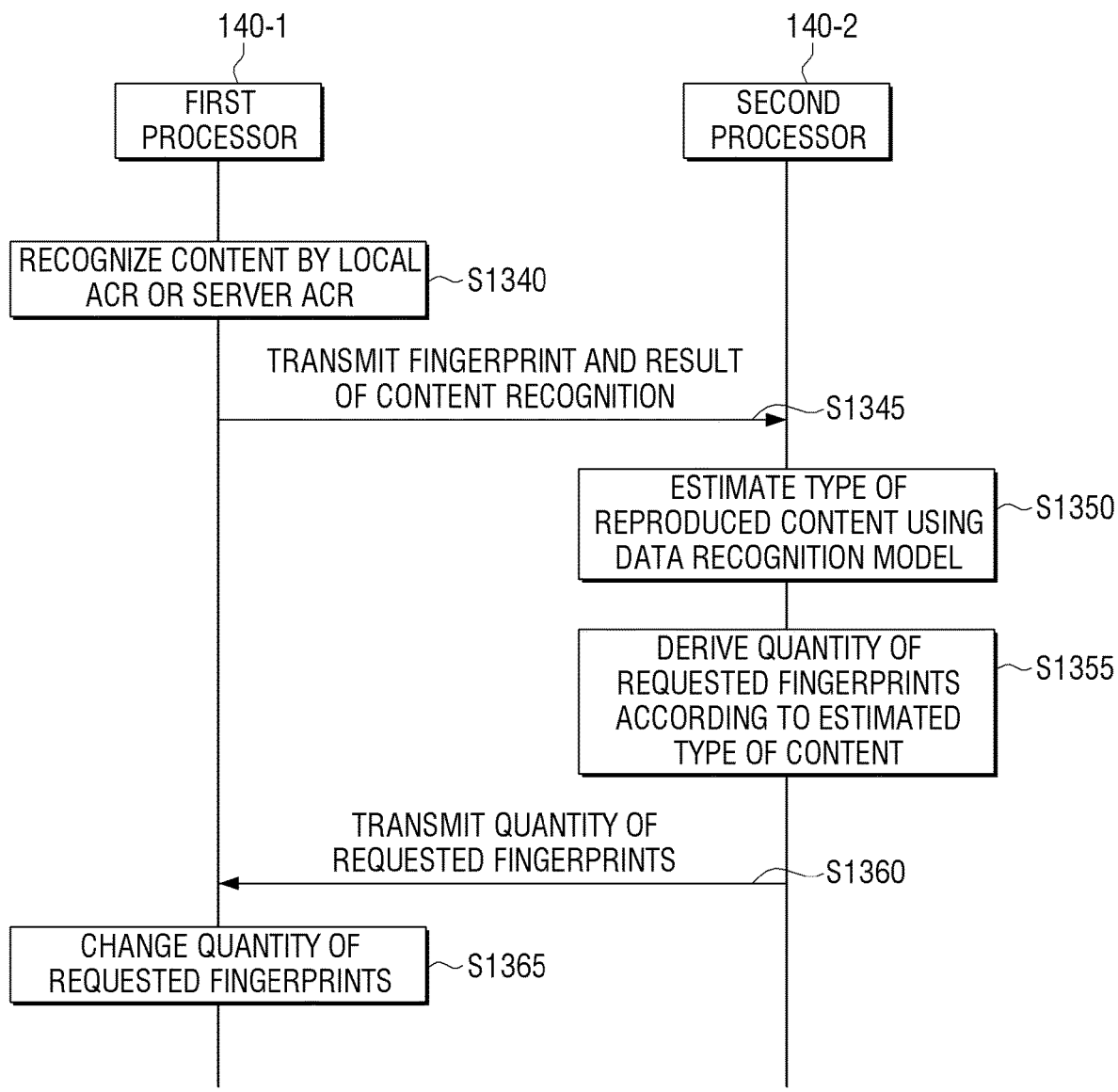

FIG. 13B is a view illustrating a method for determining a quantity of fingerprints to be requested by a display apparatus according to another embodiment of the present disclosure.

Referring to FIG. 13B, the first processor 140-1 may control to execute at least one application installed in the display apparatus 100. For example, the first processor 140-1 may capture an image displayed on the display and generate a fingerprint, and may perform ACR.

The second processor 140-2 may estimate a type of a content using a data recognition model. The data recognition model may be, for example, a set of algorithms for estimating a type of a content using information of the content and a fingerprint generated from the content, using a result of statistical machine learning.

Referring to FIG. 13B, the first processor 140-1 may recognize a currently reproduced content at operation S1340.

The first processor 140-1 may transmit a result of content recognition to the second processor 140-2 at operation S1345.

The second processor 140-2 may estimate the type of the reproduced content using the data recognition model at operation S1350. For example, the data recognition model may estimate the type of the content (for example, video/audio data) based on learning data related to information of the content (for example, video/audio data) and the type of the content (for example, video/audio data).

The second processor 140-2 may derive a quantity of fingerprints to be requested from a server (for example, the server 200 of FIG. 1) according to the estimated type of the content at operation S1355. Since the number of image frames existing in the server 200 varies according to the type of the content, the number of fingerprints corresponding to the respective frames and existing in the server 200 may also vary according to the type of the content.

The second processor 140-2 may transmit the derived quantity of fingerprints to be requested to the first processor 140-1 at operation 51360. The first processor 140-1 may determine the quantity of fingerprints to be requested based on the received quantity of fingerprints at operation S1365.

According to various embodiments of the present disclosure, the first processor 140-1 may receive the estimated type of the content from the second processor 140-2, and may perform at operation S1355.

FIGS. 14A, 14B, 15A, and 15B are views illustrating a method for predicting a content of a display apparatus according to various embodiments of the present disclosure.

Figure 14A:
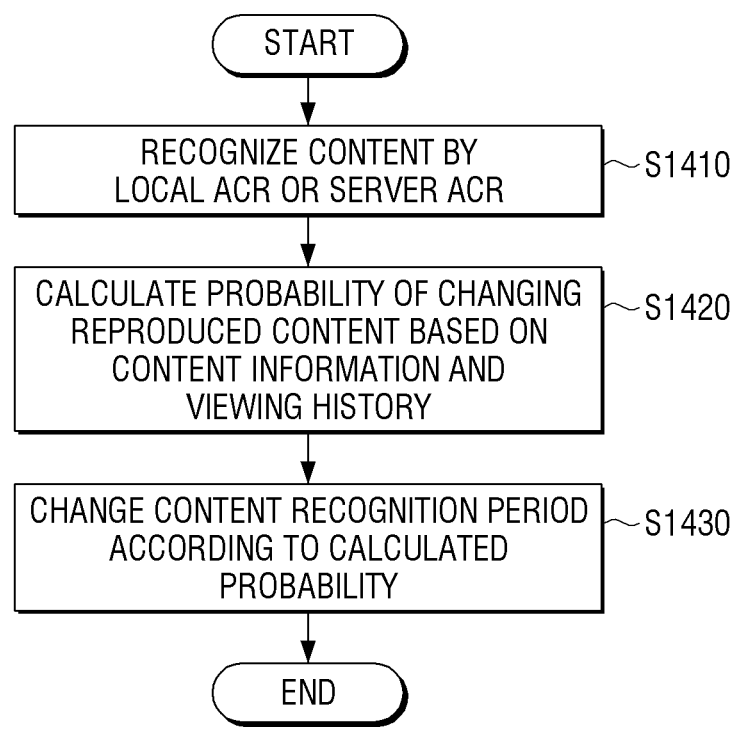

Referring to FIG. 14A, the display apparatus 100 may recognize a currently reproduced content at operation S1410.

In addition, the display apparatus 100 may calculate a probability that the currently reproduced content is changed based on information on the recognized content and a viewing history at operation S1420. For example, the viewing history may include a channel that a user has viewed, a viewing time, an ID of the display apparatus, user information, an executed additional application, or the like.

According to various embodiments of the present disclosure, the display apparatus 100 may estimate the probability that the currently reproduced content is changed using a data recognition model (for example, the data recognition model described in FIGS. 3 to 4B).

In addition, the display apparatus 100 may change a content recognition period according to the calculated probability at operation S1430. For example, in response to it being determined that the user usually enjoys viewing a content different from the currently recognized content with reference to the viewing history, the display apparatus 100 may determine that there is a high probability that the currently reproduced content is changed. In this case, the display apparatus 100 may change the content recognition period to be short.

On the other hand, in response to it being determined that the content corresponding to the usual viewing history is reproduced, the display apparatus 100 may determine that there is a low probability that the currently reproduced content is changed. In this case, the display apparatus 100 may change the content recognition period to be long.

Figure 14B:
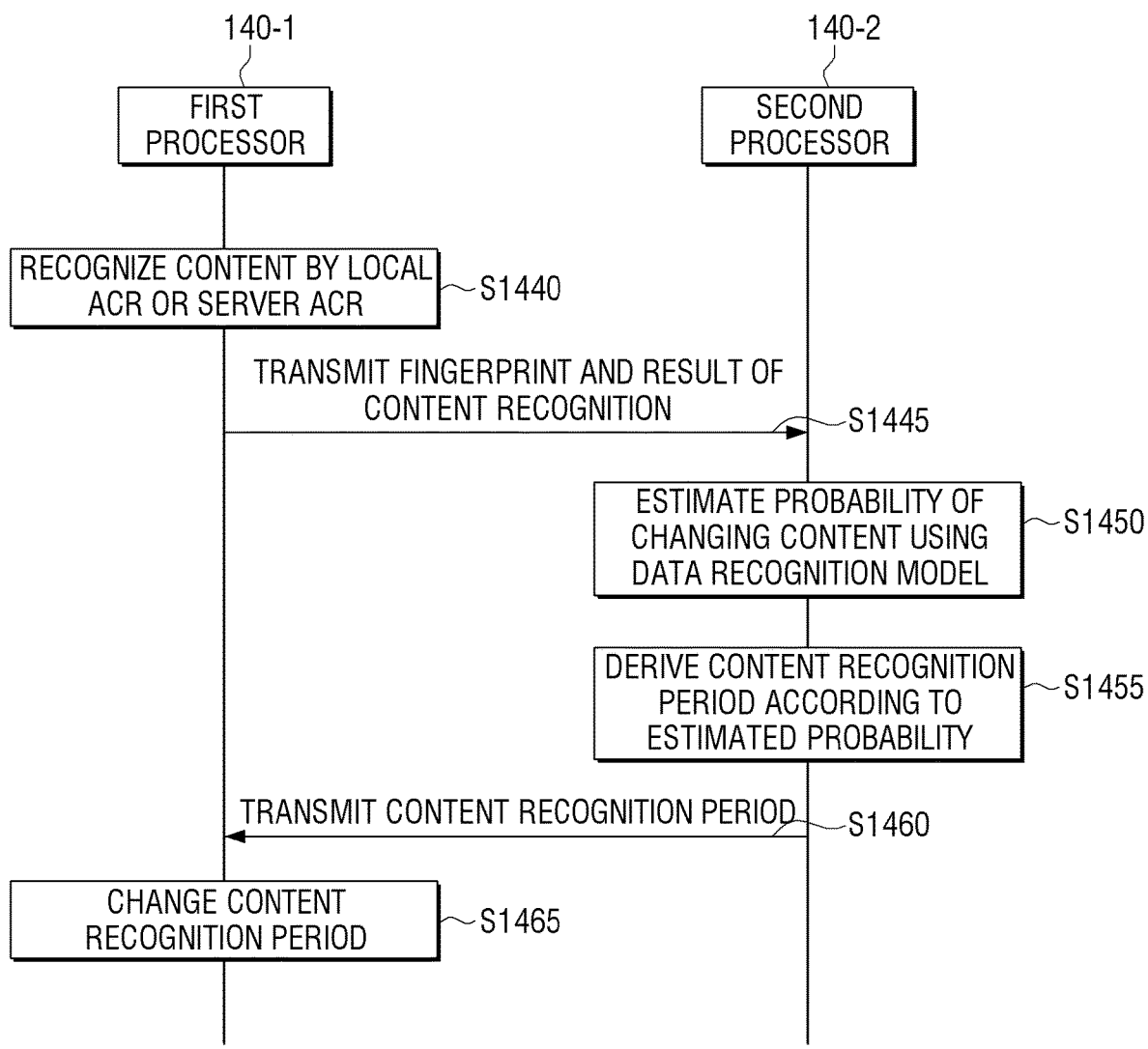

FIG. 14B is a view illustrating a method for predicting a content and changing a content recognition period in a display apparatus including a first processor and a second processor according to an embodiment of the present disclosure.

Referring to FIG. 14B, the first processor 140-1 may control to execute at least one application installed in the display apparatus 100. For example, the first processor 140-1 may capture an image displayed on the display and generate a fingerprint, and may perform ACR.

The second processor 140-2 may estimate a probability that a content is changed using a data recognition model. The data recognition model may be, for example, a set of algorithms for estimating a probability that video/audio data is changed to another video/audio data during reproduction, based on learning data related to information of video/audio data, a type of video/audio data, and a viewing history of video/audio data (for example, a history of having changed to another video/audio data).

Referring to FIG. 14B, the first processor 140-1 may recognize a currently reproduced content at operation S1440.

The first processor 140-1 may transmit a result of content recognition to the second processor 140-2 at operation S1445.

The second processor 140-2 may estimate a probability that the reproduced content is changed using the data recognition model at operation S1450.

The second processor 140-2 may derive a content recognition period according to the estimated probability at operation S1455.

The second processor 140-2 may transmit the derived content recognition period to the first processor 140-1 at operation S1460.

The first processor 140-1 may change the content recognition period based on the received content recognition period at operation S1465.

According to various embodiments of the present disclosure, the first processor 140-1 may receive the estimated probability that the content is changed from the second processor 140-2, and may perform at operation S1455.

Figure 15A:
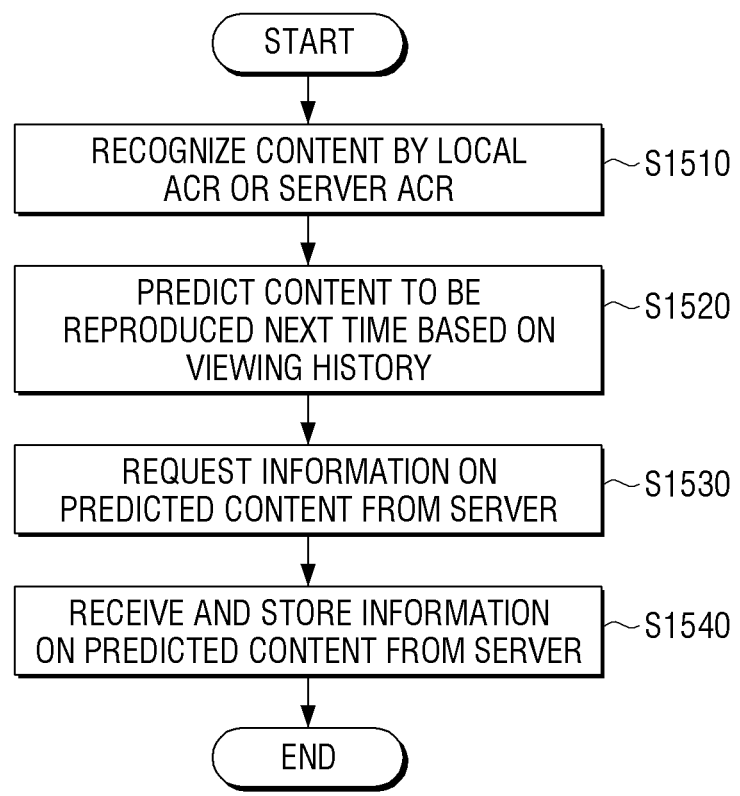

Referring to FIG. 15A, the display apparatus 100 may recognize a currently reproduced content at operation S1510. In addition, the display apparatus 100 may predict a content to be reproduced next time based on a viewing history at operation S1520. For example, in response to the user of the display apparatus 100 having a viewing history of usually viewing specific two channels, the display apparatus 100 may predict contents to be reproduced in the two channels as a content to be reproduced next time.

According to various embodiments of the present disclosure, the display apparatus 100 may estimate a content to be reproduced after the currently reproduced content using a data recognition model (for example, the data recognition model described in FIGS. 3 to 4B).

The display apparatus 100 may request fingerprint information of the predicted content from the server 200 at operation S1530. In addition, the display apparatus 100 may receive information on the predicted content from the server 200 in advance, and may store the same at operation S1540.

The information on the predicted content which is transmitted to the display apparatus 100 from the server 200 may include at least one of information of the content currently reproduced in the display apparatus 100, fingerprints of the currently recognized content and of the content predicted as being reproduced next time, and a control signal for changing the content recognition period of the display apparatus 100. For example, the display apparatus 100 may receive fingerprint information of the contents to be reproduced in the above-described two channels from the server 200 in advance, and may store the same. By doing so, the display apparatus 100 may receive optimized fingerprints to be used for local ACR.

Figure 15B:
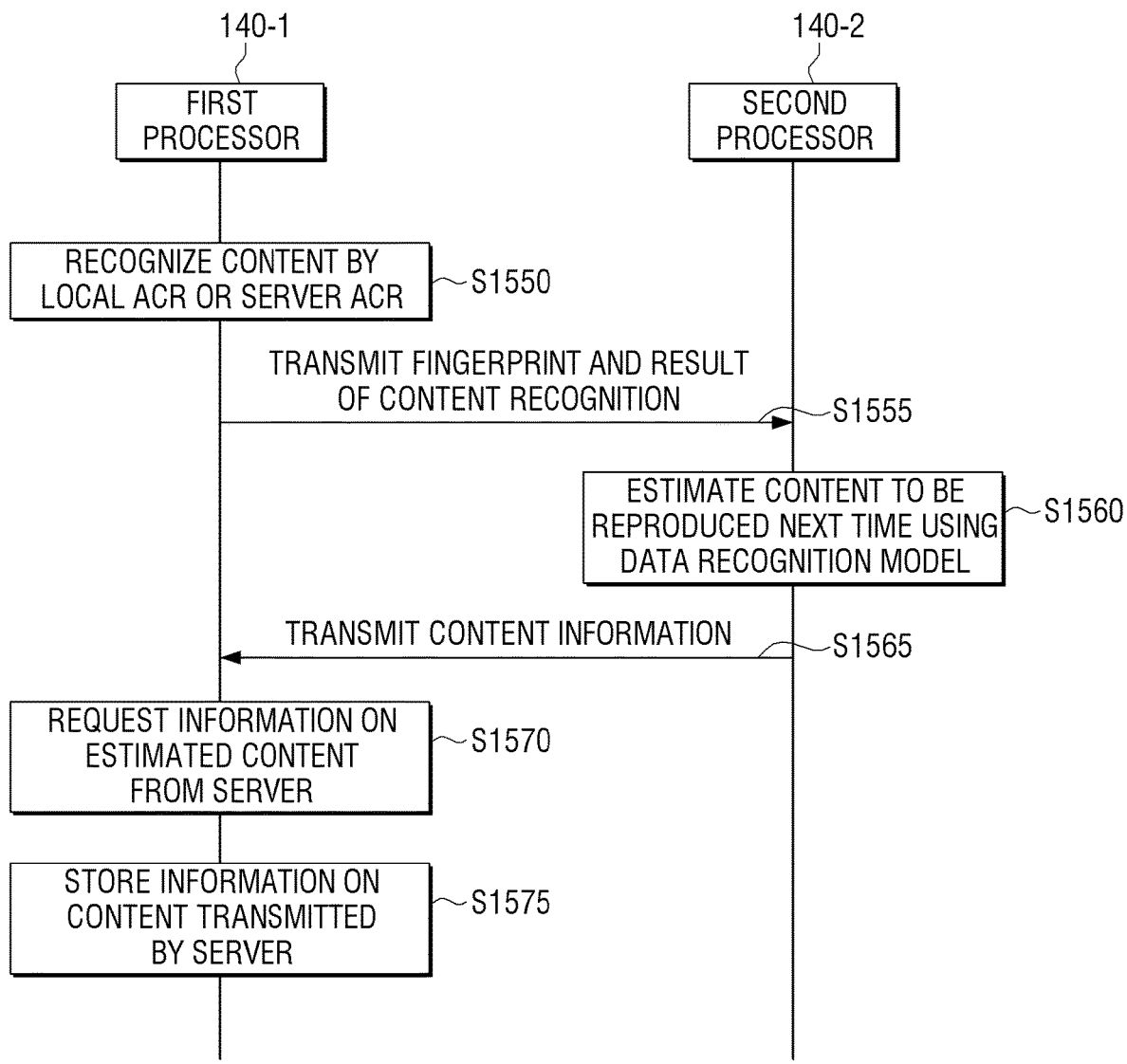

FIG. 15B is a view illustrating a method for predicting a content and receiving information on a predicted content in advance in a display apparatus including a first processor and a second processor 140-2 according to an embodiment of the present disclosure.

Referring to FIG. 15B, the first processor 140-1 may control to execute at least one application installed in the display apparatus 100. For example, the first processor 140-1 may capture an image displayed on the display and generate a fingerprint, and may perform ACR.

The second processor 140-2 may estimate a probability that a content is changed using a data recognition model. The data recognition model may be, for example, an algorithm for estimating video/audio data to be reproduced after the reproduction is completed, based on learning data related to information of video/audio data, a type of video/audio data, and a viewing history of video/audio data (for example, a history of having changed to another video/audio data).

Referring to FIG. 15B, the first processor 140-1 may recognize a currently reproduced content at operation S1550.

The first processor 140-1 may transmit a result of content recognition to the second processor 140-2 at operation S1555.

The second processor 140-2 may estimate a content to be reproduced after the currently reproduced content using the data recognition model at operation S1560.

The second processor 140-2 may transmit the content to be reproduced next time to the first processor 140-1 at operation S1565.

The first processor 140-1 may request information on the predicted content from a server (for example, the server 200 of FIG. 1) at operation S1570.

The first processor 140-1 may receive the information on the predicted content from the server (for example, the server 200 of FIG. 1), and store the same at operation S1575.

According to various embodiments of the present disclosure, the second processor 140-2 may perform at operation S1570.

Figure 16:
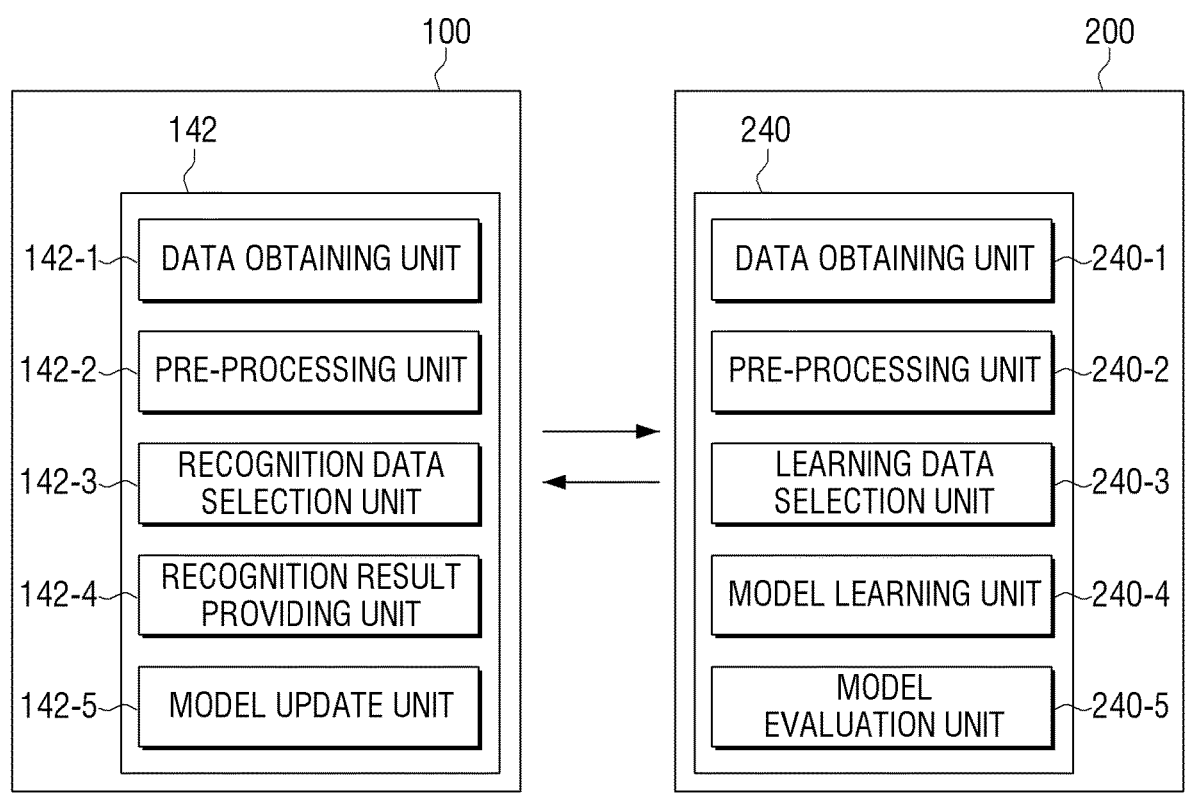
FIG. 16 is a view illustrating data being learned and recognized by a display apparatus and a server interlocked with each other according to an embodiment of the present disclosure.

FIG. 16 is a view illustrating data being learned and recognized by a display apparatus and a server interlocked with each other according to an embodiment of the present disclosure.

Referring to FIG. 16, the server 200 may learn a criterion for recognizing a content and/or a criterion for estimating a type of a content and/or a criterion for estimating a probability that a content is changed, and the display apparatus 100 may set a criterion for distinguishing image frames based on results of learning by the server 200, and may a type of a content and a probability that a content is changed.

In this case, a data learning unit 240 of the server 200 may include a data obtaining unit 240-1, a pre-processing unit 240-2, a learning data selection unit 240-3, a model learning unit 240-4, and a model evaluation unit 240-5. The data learning unit 240 may perform the function of the data learning unit 141 shown in FIG. 4A. The data learning unit 240 of the server 200 may learn in order for a data recognition model to have a criterion for analyzing a characteristic of video/audio data. The server 200 may analyze a characteristic of each captured frame according to the learned criterion, and may generate a fingerprint.

The data learning unit 240 may determine what learning data will be used to determine a characteristic of a screen (or frame) of a captured content. In addition, the data learning unit 240 may learn a criterion for extracting the characteristic of the captured content using the determined learning data. The data learning unit 240 may obtain data to be used for learning, and may learn the criterion for analyzing the characteristic by applying the obtained data to the data recognition model which will be described below.

According to various embodiments of the present disclosure, the data learning unit 240 may learn in order for the data recognition model to have a criterion for estimating a type of video/audio data based on learning data related to information of predetermined video/audio data and a type of video/audio data.

According to various embodiments of the present disclosure, the data learning unit 240 may learn in order for the data recognition model to have a criterion for estimating a probability that video/audio data is changed to another video/audio data during reproduction or estimating video/audio data to be reproduced next time after the reproduction is completed, based on learning data related to information of predetermined video/audio data, a type of video/audio data, and a viewing history of video/audio data (for example, a history of having changed to another video/audio data).

In addition, the recognition result providing unit 142-4 of the display apparatus 100 may determine a situation by applying data selected by the recognition data selection unit 142-3 to the data recognition model generated by the server 200. In addition, the recognition result providing unit 142-4 may receive the data recognition model generated by the server 200 from the server 200, and may analyze an image or determine a type of a content using the received data recognition model. In addition, the model update unit 142-5 of the display apparatus 100 may provide the analyzed image and the determined type of the content to the model learning unit 240-4 of the server 200, such that the data recognition model can be updated.

For example, the display apparatus 100 may use the data recognition model which is generated by using computing power of the server 200. In addition, a plurality of display apparatuses 100 transmit the learned or recognized data information to the server 200, such that the data recognition model of the server 200 can be updated. In addition, each of the plurality of display apparatuses 100 transmits the learned or recognized data information to the server 200, such that the server 200 can generate a data recognition model personalized to each of the display apparatuses 100.

Figure 17:
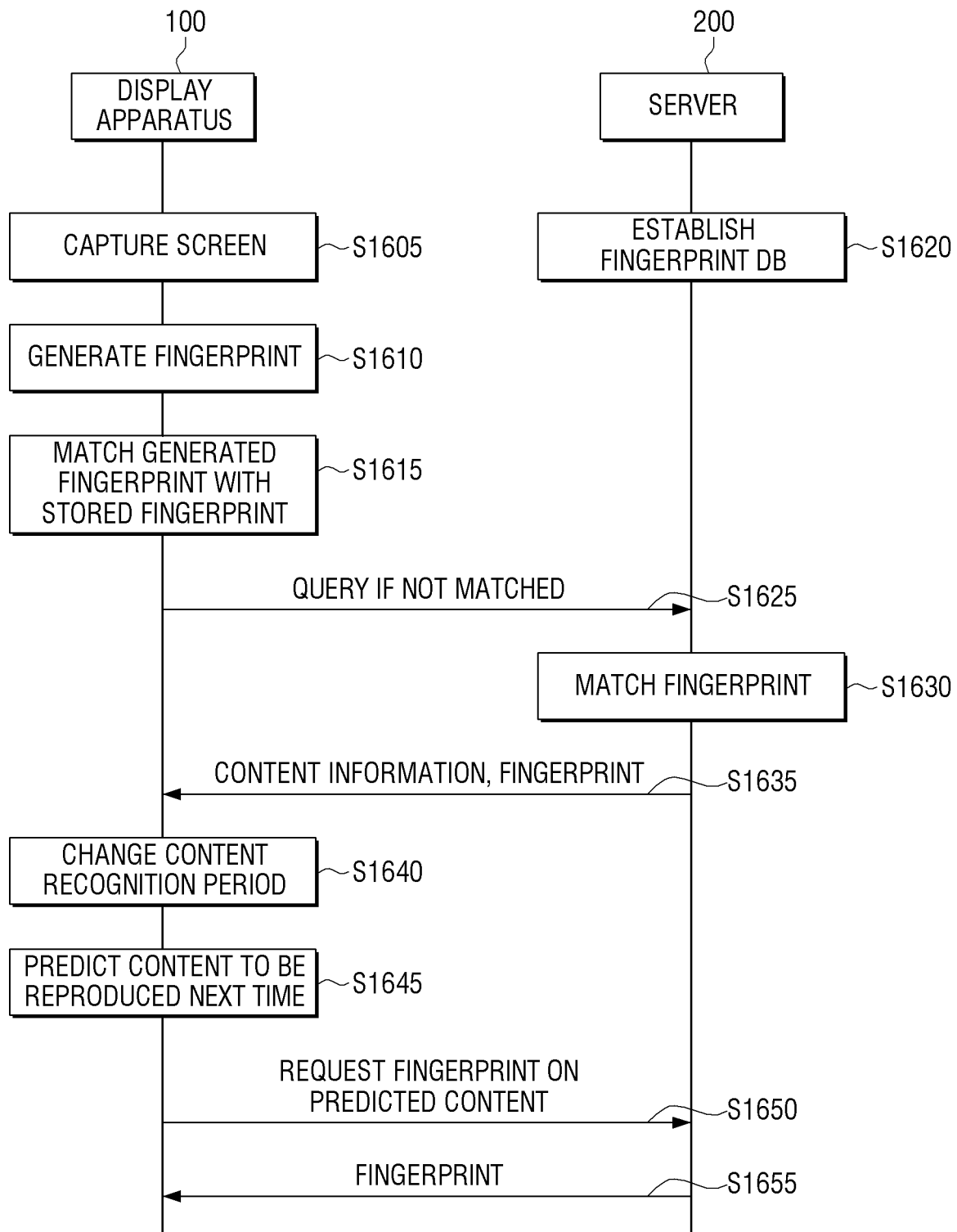
FIG. 17 is a flowchart illustrating a content recognizing method of a display system according to an embodiment of the present disclosure.

FIG. 17 is a flowchart illustrating a content recognizing method of a display system according to an embodiment of the present disclosure.

Referring to FIG. 17, the display system 1000 may include the display apparatus 100 and the server 200. FIG. 17 illustrates a pull method which requests a fingerprint at the display apparatus 100.

First, the display apparatus 100 may capture a screen of a currently reproduced content at operation S1605. In addition, the display apparatus 100 may analyze the captured screen and extract a characteristic. The display apparatus 100 may generate a fingerprint for distinguishing the captured screen from other image frames using the extracted characteristic at operation S1610.

The display apparatus 100 may perform local ACR to match the generated fingerprint with a stored fingerprint at operation S1615. The case in which the currently reproduced content is recognized by the local ACR will not be described. In response to the currently reproduced content not being recognized by the local ACR, the display apparatus 100 may transmit a query including the generated fingerprint to the server at operation S1625.

The server 200 may already analyze various contents and may establish a fingerprint database at operation S1620. The server 200 may extract the fingerprint from the received query. In addition, the server 200 may match the extracted fingerprint with a plurality of fingerprints stored in the fingerprint database at operation S1630. The server 200 may recognize what the content questioned by the display apparatus 100 is through the matching fingerprint. The server 200 may transmit information on the recognized content and fingerprints on next image frames of the recognized content to the display apparatus 100 at operation S1635.

For example, the display apparatus 100 may transmit a query for requesting information on a fingerprint generated at the server 200. The server 200 may generate a response to the received query using a query API, and may provide the response. The query API may be an API which searches the fingerprint included in the query in the fingerprint database and provides stored relevant information. In response to the query being received, the query API of the server 200 may search whether the fingerprint included in the query exists in the fingerprint database. In response to the fingerprint being searched, the query API may transmit a name of the content, a position of the frame corresponding to the searched fingerprint in the whole content, a reproducing time, or the like to the display apparatus 100 in response to the query. In addition, the query API may transmit fingerprints corresponding to frames which are positioned after the frame showing the fingerprint in time in the whole content to the display apparatus 100.

In addition, when the content reproduced at the display apparatus 100 can be streamed through the server 200 (for example, VOD or a broadcast signal), the server 200 may transmit the fingerprints to the display apparatus 100 with the next frames of the recognized content. In this case, the fingerprints may be paired with the corresponding frames of the recognized contents and transmitted. For example, the fingerprint may be provided in the form of one file added to the content, and information for mapping fingerprints and corresponding frames may be included in the fingerprints.

The display apparatus 100 may determine a genre of the content, an importance, or the like using the received content information. In addition, the display apparatus 100 may change a content recognition period based on the criterion, such as the genre of the content, the importance, or the like at operation S1640. In addition, the display apparatus 100 may predict a content to be reproduced next time using a viewing history with the content information at operation S1645. The content to be reproduced next time refers to a content which is different from the currently reproduced content.

The display apparatus 100 may request a fingerprint on the predicted content from the server 200 at operation S1650. In addition, the display apparatus 100 may request the predicted content itself as well as the fingerprint from the server 200. In response to this, the server 200 may transmit the requested fingerprint to the display apparatus 100 at operation S1655. In response to the predicted content being stored in the server 200 or the predicted content being able to be streamed to the display apparatus 100 through the server 200, the server 200 may transmit not only the requested fingerprint but also the content paired with the fingerprint to the display apparatus 100.

The display apparatus 100 may store the received fingerprint and may use the same for local ACR when a next content recognition period arrives.

Figure 18:
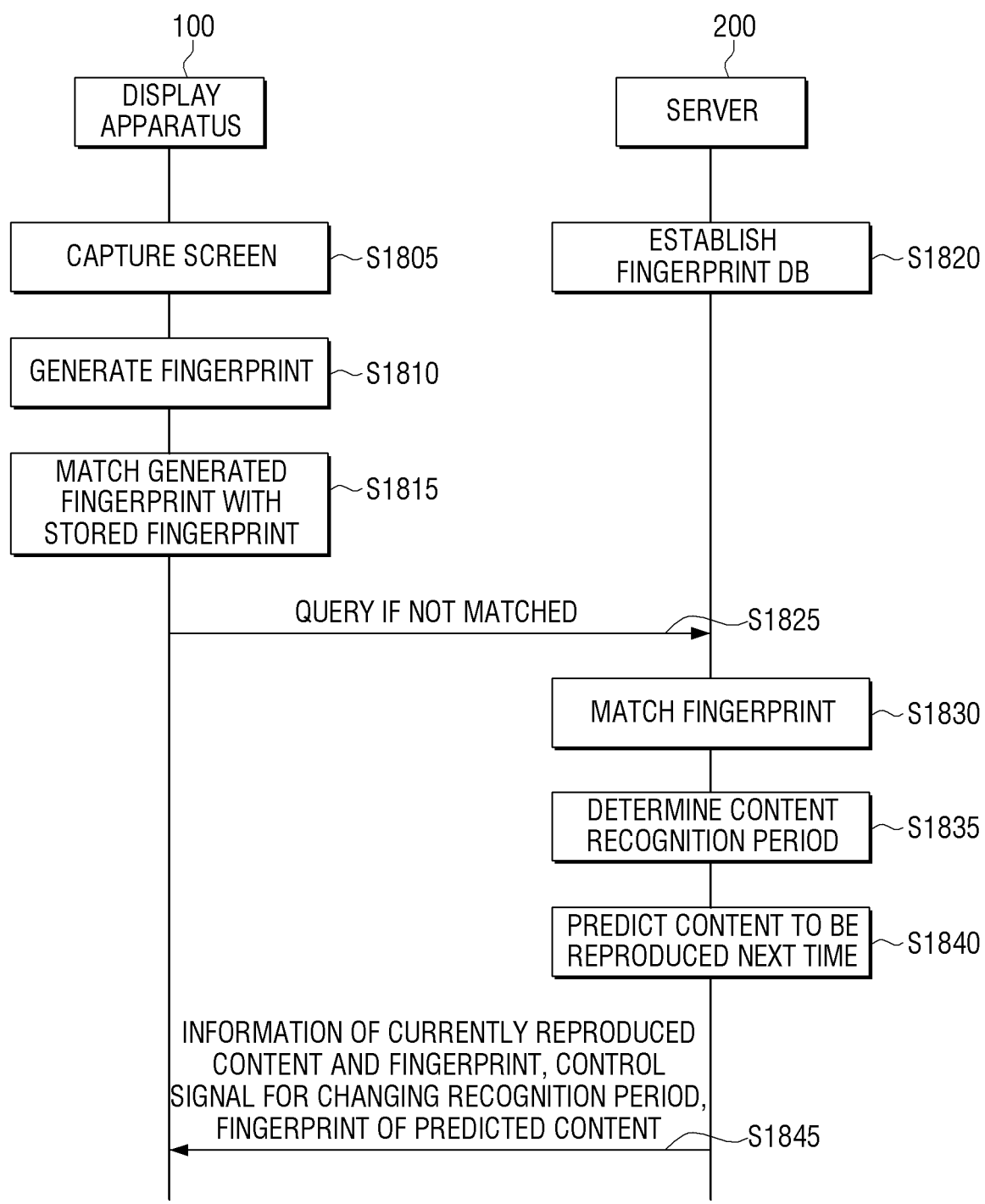
FIG. 18 is a flowchart illustrating a content recognizing method of a display system according to an embodiment of the present disclosure.

FIG. 18 is a flowchart illustrating a content recognizing method of a display system according to an embodiment of the present disclosure.

Referring to FIG. 18, the display system 1000 may include the display apparatus 100 and the server 200. FIG. 18 illustrates a push method in which the server 200 transmits a fingerprint preemptively.

First, the display apparatus 100 may capture a screen of a currently reproduced content at operation S1805. In addition, the display apparatus 100 may analyze the captured screen and extract a characteristic. The display apparatus 100 may generate a fingerprint for distinguishing the captured screen from other image frames using the extracted characteristic at operation S1810.

The display apparatus 100 may perform local ACR to match the generated fingerprint with a stored fingerprint at operation S1815. In addition, in response to the currently reproduced content not being recognized by the local ACR, the display apparatus 100 may transmit a query including the generated fingerprint to the server at operation S1825.

The query may include information of the display apparatus 100 in addition to the fingerprint. For example, the information of the display apparatus 100 may be a physical ID of the display apparatus 100, an IP address of the display apparatus 100, or information for specifying the user of the display apparatus 100, such as a user ID which is transmitted to the server 200 through the display apparatus 100.

The server 200 may manage a viewing history on each display apparatus 100 using the information of the display apparatus 100. For example, in response to a client device accessing, the server 200 may collect a device ID, and may perform the above-described operation using a client management API for managing a viewing history for each device ID.

The server 200 may already analyze various contents and may establish a fingerprint database at operation S1820. The server 200 may store information of contents corresponding to fingerprints in the database. For example, the server 200 may store, in the database, a name of a content corresponding to a fingerprint, a position of a frame corresponding to a fingerprint in the whole content, a reproducing time, a content ID, a content provider, content series information, a genre, information on whether the content is a real-time broadcast, information on whether the content is paid content, or the like.

The server 200 may extract the fingerprint from the received query. For example, the query API of the server 200 may extract only information corresponding to the fingerprint from string information of the received query. In addition, the server 200 may match the extracted fingerprint with a plurality of fingerprints stored in the fingerprint database at operation 51830.

The server 200 may recognize what the content questioned by the display apparatus 100 is through the matching fingerprint. The server 200 may determine a genre of the content, an importance, or the like using the determined content information. In addition, the server 200 may change a content recognition period based on the criterion, such as the genre of the content, the importance, or the like at operation S1835. In addition, the server 200 may predict a content to be reproduced next time using a viewing history with the content information at operation S1840. For example, in the embodiment of FIG. 18, the server 200 may perform the operations of changing the content recognition period and predicting the content to be reproduced next time.

Based on the information grasped in this process, the server 200 may transmit the fingerprint information or the like to the display apparatus 100 without receiving a request from the display apparatus 100 at operation S1845. For example, the server 200 may transmit, to the display apparatus 100, information of the content currently reproduced at the display apparatus 100, fingerprints of the currently reproduced content and of the content predicted as being reproduced next time, and a control signal for changing the content recognition period of the display apparatus 100. In another example, the server 200 may transmit the content itself which is predicted as being reproduced next time with the fingerprint. In this case, the fingerprints may be combined with all of the frames of the content, or the fingerprints may be combined with every frame of intervals which are set according to the content recognition period.

In addition, the server 200 may transmit an advertisement screen regarding a product included in the frame of the content to be displayed on the display apparatus 100, a product buy UI, or the like to the display apparatus 100 without receiving a request from the display apparatus 100. The server 200 may grasp a history of having bought a product during viewing time based on the information of the display apparatus 100 received from the display apparatus 100. The server 200 may change a frequency of transmitting the advertisement screen or the like using personalized information, such as a product buying history or a viewing history.

The server 200 may generate the advertisement screen with a size suitable to each screen displayed on the display apparatus 100, using resolution information of the display apparatus 100, information indicating which portion of the frame of the content corresponds to a background, or the like. In addition, the server 200 may transmit a control signal for displaying the advertisement screen on an appropriate position on the screen of the display apparatus 100 to the display apparatus 100 with the advertisement screen.

In another example, the server 200 may request a second server 300 to provide an advertisement screen. For example, the second server 300 may be a separate server which provides an advertisement providing function. The second server 300 may receive information including a product to be advertised, a resolution of the display apparatus 100, or the like from the server 200. According to the received information, the second server 300 may generate an advertisement screen with an appropriate size. The second server 300 may transmit the generated advertisement screen to the server 200, or may directly transmit the advertisement screen to the display apparatus 100. In the embodiment in which the second server 300 directly transmits the advertisement screen to the display apparatus 100, the server 200 may provide communication information, such as an IP address of the display apparatus 100 to the second server 300.

Figure 19:
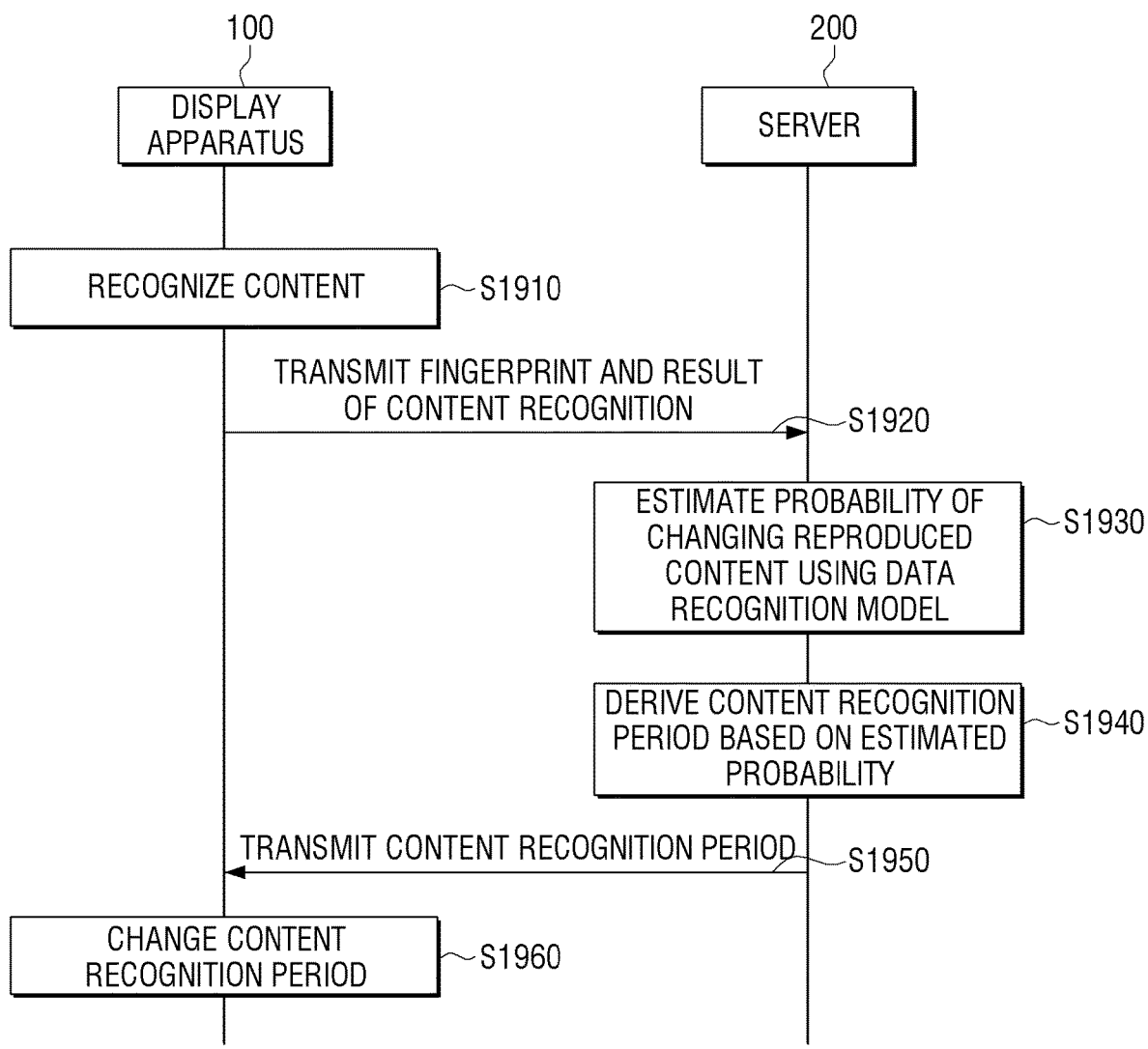
FIG. 19 is a view illustrating a situation in which a display apparatus changes a content recognition period according to a probability that a content is changed by interlocking with a server according to an embodiment of the present disclosure.

FIG. 19 is a view illustrating a situation in which a display apparatus changes a content recognition period according to a probability that a content is changed by interlocking with a server according to an embodiment of the present disclosure.

Referring to FIG. 19, the server 200 may estimate a probability that a content is changed using a data recognition model. The data recognition model may be, for example, a set of algorithms for estimating a probability that video/audio data is changed to another video/audio data during reproduction, based on learning data related to information of video/audio data, a type of video/audio data, and a viewing history of video/audio data (for example, a history of having changed to another video/audio data).

In this case, an interface for transmitting/receiving data between the display apparatus 100 and the server 200 may be defined.

For example, an API having learning data to be applied to the data recognition model as a factor value (or a parameter value or a transfer value) may be defined. The API may be defined as a set of sub-routines or functions which is called at one protocol (for example, a protocol defined by the display apparatus 100) to perform certain processing of another protocol (for example, a protocol defined by the server 200). For example, through the API, an environment in which one protocol can perform an operation of another protocol may be provided.

Referring to FIG. 19, the display apparatus 100 may recognize a currently reproduced content at operation S1910. The display apparatus 100 may recognize a content using local ACR or server ACR, for example.

The display apparatus 100 may transmit a result of content recognition to the server 200 at operation S1920. For example, the display apparatus 100 may transmit the result of content recognition to the server 200 to request the server 200 to estimate a probability that the reproduced content is changed.

The server 200 may estimate a probability that the reproduced content is changed using the data recognition model at operation S1930.

The server 200 may derive a content recognition period according to the probability that the content is changed at operation S1940. For example, in response to it being determined that the user usually enjoys viewing a content different from the currently recognized content with reference to a viewing history based on a query history (for example, channel change) requested to the server 200 by the display apparatus 100, the display apparatus 100 may determine that there is a high probability that the currently reproduced content is changed. In this case, the display apparatus 100 may change the content recognition period to be short.

On the other hand, in response to it being determined that the content corresponding to the usual viewing history is reproduced, the display apparatus 100 may determine that there is a low probability that the currently reproduced content is changed. In this case, the display apparatus 100 may change the content recognition period to be long.

The server 200 may transmit the derived content recognition period to the display apparatus 100 at operation S1950. The display apparatus 100 may change the content recognition period based on the received content recognition period at operation S1960.

Figure 20:
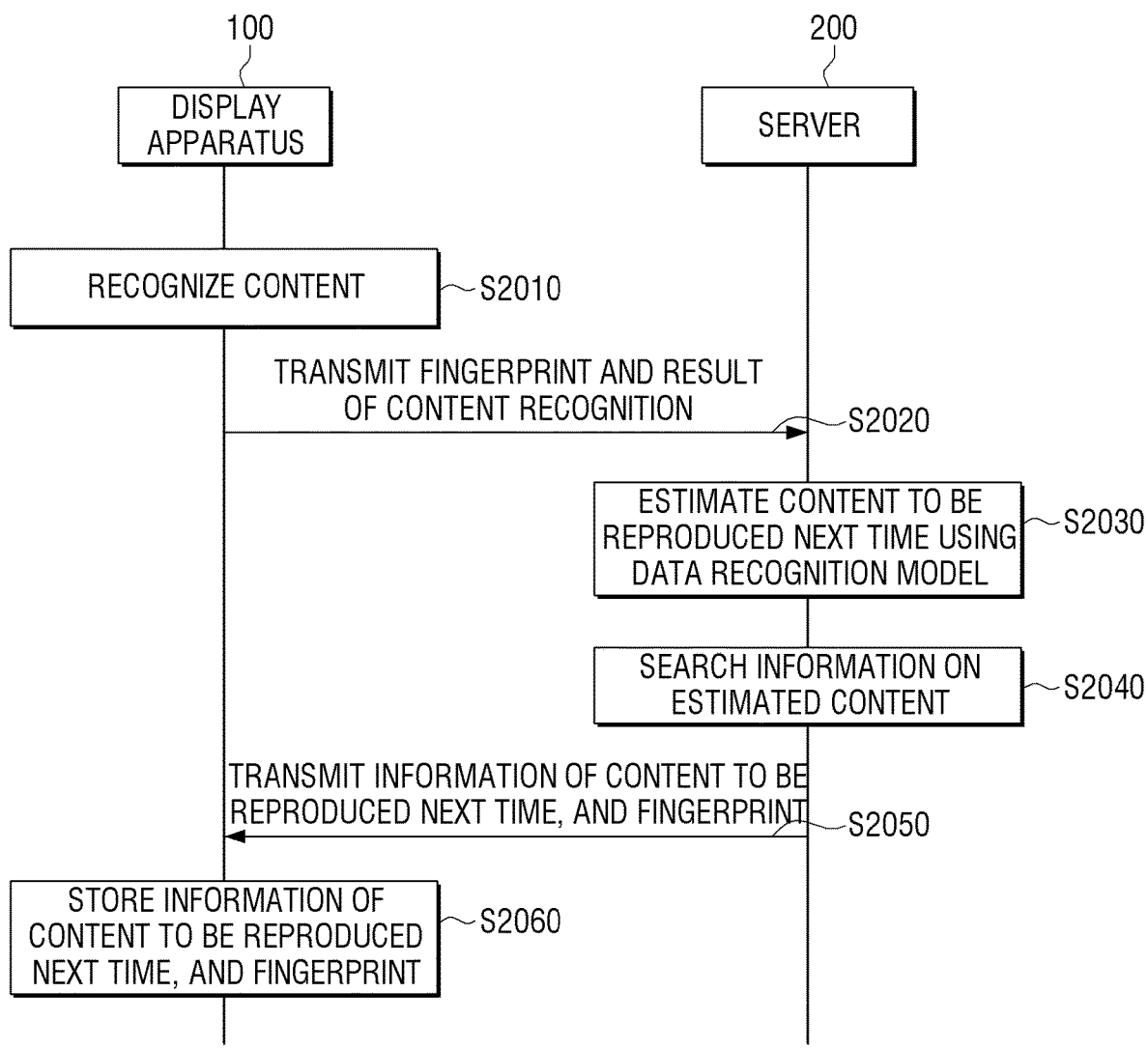
FIG. 20 is a view illustrating a method by which a display apparatus predicts a content to be reproduced next time, and receives information on a predicted content in advance by interlocking with a server according to an embodiment of the present disclosure.

FIG. 20 is a view illustrating a method by which a display apparatus predicts a content to be reproduced next time and receives information on a predicted content in advance by interlocking with a server according to an embodiment of the present disclosure.

Referring to FIG. 20, the server 200 may estimate a probability that a content is changed using the data recognition model. The data recognition model may be, for example, an algorithm for estimating video/audio data to be reproduced next time after reproduction is completed, based on learning data related to information of video/audio data, a type of video/audio data, and a viewing history of video/audio data (for example, a history of having changed to another video/audio data).

The display apparatus 100 may recognize a currently reproduced content at operation 52010.

The display apparatus 100 may transmit a result of content recognition to the server 200 at operation 52020.

The server 200 may estimate a content to be reproduced after the currently reproduced content using the data recognition model at operation 52030.

The server 200 may search information on the estimated content at operation 52040.

The server 200 may transmit the information on the content to be reproduced next time to the display apparatus 100 at operation 52050.

The display apparatus 100 may receive the information on the estimated content from the server 200, and may store the same at operation 52060.

Figure 21:
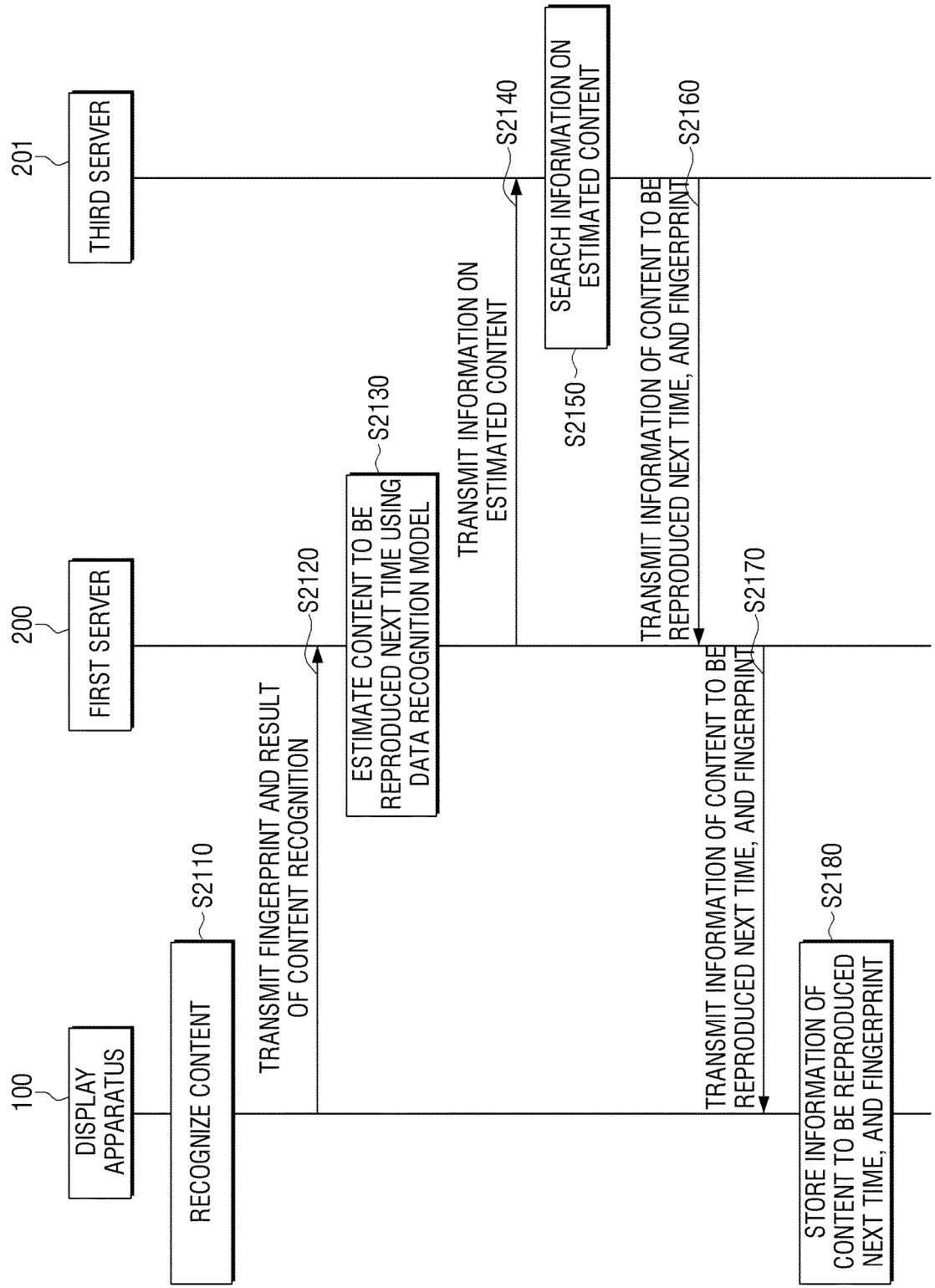
FIG. 21 is a view illustrating a method by which a display apparatus predicts a content to be reproduced next time, and receives information on a predicted content in advance by interlocking with a plurality of servers according to an embodiment of the present disclosure.

FIG. 21 is a view illustrating a method by which a display apparatus predicts a content to be reproduced next time and receives information on the predicted content in advance by interlocking with a plurality of servers according to an embodiment of the present disclosure.

Referring to FIG. 21, the first server 200 may estimate a probability that a content is changed using the data recognition model. The data recognition model may be, for example, an algorithm for estimating video/audio data to be reproduced next time after reproduction is completed, based on learning data related to information of video/audio data, a type of video/audio data, and a viewing history of video/audio data (for example, a history of having changed to another video/audio data).

The third server 201 may include a cloud server which stores information on contents, for example.

The display apparatus 100 may recognize a currently reproduced content at operation S2110.

The display apparatus 100 may transmit a result of content recognition to the first server 200 at operation S2120.

The first server 200 may estimate a content to be reproduced after the currently reproduced content using the data recognition model at operation S2130.

The first server 200 may transmit the estimated content to the second server to request the second server to search information at operation S2140.

The third server 201 may search information on the content at operation S2150.

The third server 201 may transmit the information on the content to be reproduced next time to the first server 200 at operation S2160. In addition, the first server 200 may transmit the information on the content to be reproduced next time to the display apparatus 100 at operation S2170. However, according to various embodiments of the present disclosure, the third server 201 may transmit the information on the content to be reproduced next time to the display apparatus 100.

The display apparatus 100 may receive the information on the estimated content from the first server 200 or the third server 201, and may store the same at operation S2180.

Certain aspects of the present disclosure can also be embodied as computer readable code on a non-transitory computer readable recording medium. A non-transitory computer readable recording medium is any data storage device that can store data which can be thereafter read by a computer system. Examples of the non-transitory computer readable recording medium include a Read-Only Memory (ROM), a Random-Access Memory (RAM), Compact Disc-ROMs (CD-ROMs), magnetic tapes, floppy disks, and optical data storage devices. The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

At this point it should be noted that the various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include a ROM, a RAM, CD-ROMs, magnetic tapes, floppy disks, and optical data storage devices. The processor readable mediums can also be distributed over network coupled computer systems so that the instructions are stored and executed in a distributed fashion. In addition, functional computer programs, instructions, and instruction segments for accomplishing the present disclosure can be easily construed by programmers skilled in the art to which the present disclosure pertains.

According to various embodiments of the present disclosure, the disclosed embodiments may be implemented by using an S/W program including instructions stored in a computer-readable storage medium.

A computer is a device which calls stored instructions from a storage medium, and can perform operations according to the disclosed embodiments according the called instructions, and may include the display apparatus according to the disclosed embodiments.

The computer-readable storage medium may be provided in the form of a non-transitory storage medium. Herein, the "non-transitory" only means that the storage medium does not include signals and is tangible, and does not consider whether data is stored in the storage medium semi-permanently or temporarily.

In addition, the control method according to the disclosed embodiments may be included in a computer program product and provided. The computer program product may be traded between a seller and a purchaser as a product.

The computer program product may include an S/W program, and a computer readable storage medium which stores the S/W program. For example, the computer program product may include a product in an S/W program form (for example, a downloadable application) which is electronically distributed through the manufacturer of the display apparatus or an electronic market (for example, Google play store, App store). To be electronically distributed, at least a part of the S/W program may be stored in a storage medium or may be temporarily generated. In this case, the storage medium may be a storage medium of a server of the manufacturer, a server of the electronic market, or an intermediate server which temporarily stores the S/W program.

The computer program product may include a storage medium of a server or a storage medium of a device in a system which includes a server and a display apparatus.

Alternatively, when there is a third device (for example, a smart phone) communication connected with the server or the display apparatus, the computer program product may include a storage medium of the third device. Alternatively, the computer program product may include an S/W program itself that is transmitted from the server to the display apparatus or the third device, or transmitted from the third device to the display apparatus.

In this case, one of the server, the display apparatus, and the third device may execute the computer program product and perform the method according to the disclosed embodiments. Alternatively, two or more of the server, the display apparatus, and the third device may execute the computer program product and perform the method according to the disclosed embodiments in a distributed manner.

For example, the server (for example, a cloud server or an AI server) may execute the computer program product stored in the server, and may control the display apparatus communication connected with the server to perform the method according to the disclosed embodiments.

In another example, the third device may execute the computer program product, and may control the display apparatus communication connected with the third device to perform the method according to the disclosed embodiments. When the third device executes the computer program product, the third device may download the computer program product from the server, and may execute the downloaded computer program product. Alternatively, the third device may execute the computer program product provided in a preloaded state, and may perform the method according to the disclosed embodiments.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A display apparatus comprising:
   a display;
   a memory storing one or more fingerprints obtained based on a characteristic of content, and storing information regarding the content corresponding to the one or more fingerprints, respectively;
   a transceiver; and
   at least one processor configured to:
   obtain a fingerprint based on a characteristic of a screen of content being currently reproduced on the display,
   in response to obtaining the fingerprint, search the memory for a stored fingerprint among the one or more fingerprints matching the obtained fingerprint,
   based on the stored fingerprint not matching the obtained fingerprint, control the transceiver to transmit a query comprising the obtained fingerprint to a server to request information on the content being currently reproduced,
   based on the stored fingerprint matching the obtained fingerprint, recognize the content being currently reproduced based on information on content corresponding to the stored fingerprint and without transmitting the query to the server,
   identify at least one of a video type or an audio type of the content being currently reproduced based on a data recognition model that uses the obtained fingerprint, and
   change a content recognition period based on the identified at least one of video or audio type of the content being currently reproduced.

2. The display apparatus of claim 1, wherein the at least one processor is further configured to, based on the stored fingerprint not matching the obtained fingerprint, control the transceiver to receive, from the server, the information on the content being currently reproduced and one or more additional fingerprints of the content being currently reproduced.

3. The display apparatus of claim 1, wherein the at least one processor is further configured to:
   recognize content in every first period based on the content being currently reproduced comprising an advertisement, and
   recognize content in every second period, which is longer than the first period, based on the content being currently reproduced comprising a broadcast program.

4. The display apparatus of claim 2, wherein the at least one processor is further configured to change a quantity of fingerprints of the content being currently reproduced to be received according to the identified at least one of video or audio type of the content being currently reproduced.

5. The display apparatus of claim 2, wherein the at least one processor is further configured to:
   calculate a probability that the content being currently reproduced is changed based on the information on the content being currently reproduced and a viewing history, and
   change the content recognition period according to the calculated probability.

6. The display apparatus of claim 1, wherein the at least one processor is further configured to:
   predict content to be reproduced next based on a viewing history, and
   request information on the predicted content from the server.

7. The display apparatus of claim 2, wherein the at least one processor is further configured to:
   receive additional information related to the content being currently reproduced from the server, and
   control the display to display the received additional information together with the content being currently reproduced.

8. A method for recognizing content of a display apparatus, the method comprising:
   obtaining a fingerprint based on a characteristic of a screen of content being currently reproduced by the display apparatus;
   in response to obtaining the fingerprint, searching a memory of the display apparatus for a stored fingerprint matching the obtained fingerprint;
   based on the stored fingerprint not matching the obtained fingerprint, transmitting a query comprising the obtained fingerprint to a server to request information on the content being currently reproduced;
   based on the stored fingerprint matching the obtained fingerprint, recognizing the content being currently reproduced based on information on content corresponding to the stored fingerprint and without transmitting the query to the server;
   identifying at least one of a video type or an audio type of the content being currently reproduced based on a data recognition model that uses the obtained fingerprint; and changing a content recognition period based on the identified at least one of video or audio type of the content being currently reproduced.

9. The method of claim 8, further comprising, based on the stored fingerprint not matching the obtained fingerprint, receiving, from the server, the information on the content being currently reproduced and fingerprints of the content being currently reproduced.

10. The method of claim 8, wherein the changing of the content recognition period comprises:
recognizing content in every first period based on the content being currently reproduced comprising an advertisement; and
recognizing content in every second period, which is longer than the first period, based on the content being currently reproduced comprising a broadcast program.

11. The method of claim 9, further comprising changing a quantity of fingerprints of the content being currently reproduced to be received according to the identified at least one of video or audio type of the content being currently reproduced.

12. The method of claim 9, further comprising:
calculating a probability that the content being currently reproduced is changed based on the information on the content being currently reproduced and a viewing history; and
changing the content recognition period according to the calculated probability.

13. The method of claim 8, further comprising:
predicting content to be reproduced next based on a viewing history; and
requesting information on the predicted content from the server.

14. The method of claim 9, further comprising:
receiving additional information related to the content being currently reproduced from the server; and
displaying the received additional information together with the content being currently reproduced.

15. The display apparatus of claim 1,
wherein the video type comprises one of drama video data, advertisement video data, movie video data, or news video data, and
wherein the audio type comprises one of music audio data, news audio data, or advertisement audio data.

16. The display apparatus of claim 1, wherein the at least one processor is further configured to:
estimate a probability that a type of the content being currently reproduced has changed using the data recognition model, and
change the content recognition period based on the estimated probability that the type of the content being currently reproduced has changed.

* * * * *